United States Patent
Frenne et al.

(10) Patent No.: US 12,224,966 B2
(45) Date of Patent: Feb. 11, 2025

(54) CODE-DIVISION MULTIPLEXING (CDM) GROUPS FOR MULTI-SOURCE TRANSMISSION

(71) Applicant: Telefonaktiebolaget LM Ericsson (publ), Stockholm (SE)

(72) Inventors: Mattias Frenne, Uppsala (SE); Niklas Wernersson, Kungsängen (SE); Shiwei Gao, Nepean (CA); Sebastian Faxér, Stockholm (SE); Simon Järmyr, Skarpnäck (SE); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 527 days.

(21) Appl. No.: 17/421,585

(22) PCT Filed: Jan. 10, 2020

(86) PCT No.: PCT/IB2020/050179
§ 371 (c)(1),
(2) Date: Jul. 8, 2021

(87) PCT Pub. No.: WO2020/144637
PCT Pub. Date: Jul. 16, 2020

(65) Prior Publication Data
US 2022/0158805 A1    May 19, 2022

Related U.S. Application Data

(60) Provisional application No. 62/790,531, filed on Jan. 10, 2019.

(51) Int. Cl.
*H04L 5/00* (2006.01)
*H04J 13/18* (2011.01)
*H04W 72/23* (2023.01)

(52) U.S. Cl.
CPC ............ *H04L 5/0069* (2013.01); *H04J 13/18* (2013.01); *H04L 5/0051* (2013.01); *H04L 5/0053* (2013.01); *H04W 72/23* (2023.01)

(58) Field of Classification Search
CPC ... H04L 5/0051; H04L 5/0053; H04L 5/0069; H04J 13/18; H04W 72/23
See application file for complete search history.

(56) References Cited

U.S. PATENT DOCUMENTS

| | | | |
|---|---|---|---|
| 2021/0084623 A1 | 3/2021 | Zhang et al. | |
| 2021/0385800 A1* | 12/2021 | Harada | H04W 72/23 |
| 2022/0039124 A1* | 2/2022 | Frenne | H04B 7/0413 |

FOREIGN PATENT DOCUMENTS

| | | |
|---|---|---|
| CN | 108111272 A | 6/2018 |
| CN | 108199819 A | 6/2018 |
| WO | 2019029378 A1 | 2/2019 |

OTHER PUBLICATIONS

"Single NR-PDCCH based non-coherent JT in Rel-15", 3GPP TSG RAN WG1 NR Ad Hoc Meeting#4; R1-1800530; Vancouver, Canada, Jan. 22-26, 2017, pp. 1-4.
(Continued)

*Primary Examiner* — Mansour Oveissi
(74) *Attorney, Agent, or Firm* — Murphy, Bilak & Homiller, PLLC

(57) ABSTRACT

Embodiments include methods, performed by a user equipment (UE), for transmitting or receiving a plurality of physical data channels in a wireless network. Such methods include receiving, from the wireless network, an indication of a Transmission Configuration Indicator (TCI) state that includes one or more source reference signal (RS) pairs. Each source RS pair has a pair of quasi-colocation (QCL) relations with antenna ports, for demodulation reference signals (DM-RS), that are mapped to a plurality of code-division multiplexing (CDM) groups. Such methods include receiving/transmitting the physical data channels based on the QCL relations for the source RS pairs of the indicated TCI state. Each physical data channel corresponds to a CDM group and is received/transmitted in association with the
(Continued)

DM-RS having antenna ports mapped to the corresponding CDM group. Other embodiments include complementary methods performed by a wireless network, and UEs and wireless networks configured to perform such methods.

32 Claims, 14 Drawing Sheets

(56) References Cited

OTHER PUBLICATIONS

"Summary of remaining issues on CSI-Rs", 3GPP TSG RAN WG1 Meeting #91; R1-1721443; Reno, USA, Nov. 27-Dec. 1, 2017, pp. 1-16.
"3GPP TS 38.211 V15.2.0", 3rd Generation Partnership Project; Technical Specification Group Radio Access Network; NR; Physical channels and modulation (Release 15), Jun. 2018, pp. 1-96.
"Logical Channel Selection Restrictions in LCP", 3GPP TSG-RAN WG2 Nr AH#2, R2-1706681, Qingdao, P.R. China, Jun. 27-29, 2017, pp. 1-4.
"QCL assumptions across antenna ports of a same RS type", 3GPP TSG RAN WG1 #87, R1-1612493, Reno, USA, Nov. 14-18, 2016, pp. 1-3.
"WF on QCL Indication for DL Physical Channels", 3GPP TSG-RAN WG1 NR Ad Hoc #3, R1-1716842, Nagoya, Japan, Agenda item 6.2.2.3, Sep. 18-21, 2017, pp. 1-9.

\* cited by examiner

CODE-DIVISION MULTIPLEXING (CDM) GROUPS FOR MULTI-SOURCE TRANSMISSION

TECHNICAL FIELD

Embodiments of the present disclosure generally relate to wireless communication networks, and particularly relate to performance improvements to multi-source transmission in wireless communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X1 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Procotol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)-labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two interface points, namely Uu (UE/E-UTRAN Radio Interface) and S1 (E-UTRAN/EPC interface), each using a specific set of protocols, i.e., Radio Protocols and S1 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

Generally speaking, a physical channel corresponds to a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}sc$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}RB$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises subcarriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

FIG. 4 illustrates one exemplary manner in which the CCEs and REGs can be mapped to a physical resource, e.g., PRBs. As shown in FIG. 4, the REGs comprising the CCEs of the PDCCH can be mapped into the first three symbols of a subframe, whereas the remaining symbols are available for other physical channels, such as the PDSCH which carries user data. In the exemplary arrangement of FIG. 4, each of the REGs comprises four REs, which are represented by the small, dashed-line rectangles. Although two CCEs are shown in FIG. 4, the number of CCEs may vary depending on the required PDCCH capacity, which can be based on number of users, amount of measurements and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3, or 4) is known as the Control Format Indicator (CFI) indicated by the PCFICH transmitted in the first symbol of the control region.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. NR also shares various other features of LTE that were discussed above.

For NR Rel-16, it has been discussed to support multi-source transmission of PDSCH to UEs. In this context, "source" can refer to a beam, a panel, a transmission/reception point (TRP), etc. For example, to support URLLC, it can be beneficial to transmit multiple versions of a transport block (TB) of data to a UE from different TRPs. However, current techniques for conveying (e.g., to a UE) indications of single-source transmission configurations have various problems, drawbacks, and/or limitations when trying to extend them to cover a range of transmission sources (e.g., one to three) rather than just a single source.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods (e.g., procedures) for transmitting or receiving a plurality of physical data channels in a wireless network. The exemplary methods can be performed by a user equipment (UE, e.g., wireless device, IoT device, modem, etc. or component thereof) in communication with one or more network nodes (e.g., base stations, gNBs, en-gNBs, TRPs, etc., or components thereof) in the wireless network (e.g., NG-RAN).

In some embodiments, these exemplary methods can include receiving, from the wireless network, an indication of a plurality of Transmission Configuration Indicator (TCI) states, with each state including a plurality of source RS pairs. For example, the UE can receive a configuration (e.g., via RRC) of 64 configured TCI states, each with two or more source RS pairs. In such embodiments, these exemplary methods can also include, for each of the plurality of TCI states, determining channel parameters based on receiving the source RS associated with the particular TCI state.

In some embodiments, these exemplary methods can also include receiving a control message (e.g., via MAC CE) that activates at least a subset of the plurality of states that were indicated and/or configured as described above. In such embodiments, the UE can determine the channel parameters only for the activated subset of TCI states.

In some embodiments, these exemplary methods can also include receiving, from the wireless network, an indication of a plurality of antenna ports for demodulation reference signals (DM-RS), where each antenna port is mapped to a CDM group associated with one of the physical data channels.

These exemplary methods can also include receiving, from the wireless network, an indication of a TCI state that includes one or more source RS pairs, with each source RS pair having a corresponding pair of quasi-colocation (QCL) relations with antenna ports, for DM-RS, that are mapped to a plurality of code-division multiplexing (CDM) groups. In some embodiments, the indicated TCI can be one of the plurality of TCI states previously configured. In some embodiments, each corresponding QCL relation can be based on one or more of the following: Doppler shift, Doppler spread, average delay, delay spread, and spatial reception.

In some embodiments, the DM-RS can be Type-1, and the indicated TCI state can include no more than two source RS pairs. In other embodiments, the DM-RS can be Type-2, and the indicated TCI state can include no more than three source RS pairs.

In some embodiments, the indicated TCI state includes a single source RS pair, and the single source RS pair has a corresponding pair of QCL relations with all of the plurality of antenna ports.

In some embodiments, the indicated TCI state includes a first source RS pair having a corresponding first pair of QCL relations with all antenna ports associated with a first CDM group, and a second source RS pair having a corresponding second pair of QCL relations with all antenna ports associated with a second CDM group. In such embodiments, the number of antenna ports associated with the first CDM group can be different than the number of antenna ports associated with the second CDM group.

In some of these embodiments, the first and second CDM groups can be associated with respective first and second indices, where the first index is less than the second index. In such embodiments, these exemplary methods can also include receiving, from the wireless network, scheduling information for the physical data channels, where the scheduling information includes the first and second indices associated with the respective first and second CDM groups.

In other of these embodiments, the indicated TCI state can also include a third source RS pair having a corresponding third pair of QCL relations with all antenna ports associated with a third CDM group. In such case, the first, second, and third CDM groups can be associated with respective first, second, and third sources in the wireless network.

In other of these embodiments, the indicated TCI state can identify a first TCI state including the first source RS pair and a second TCI state including the second source RS pair.

In yet other embodiments, the indicated TCI state can be one of a symmetric pair of TCI states, with each TCI state of the symmetric pair including first and second source RS pairs. Moreover, each TCI state of the symmetric pair can have different QCL relations between the first and second source RS pairs and antenna ports that are mapped to first and second CDM groups.

In yet other embodiments, the indicated TCI state can include first and second source RS pairs. The first source RS pair can have a corresponding pair of QCL relations with the antenna ports mapped to a first CDM group, and the second source RS pair can have a corresponding pair of QCL relations with antenna ports mapped to second and third CDM groups.

These exemplary methods can also include receiving or transmitting the plurality of physical data channels based on the QCL relations for the one or more source RS pairs of the indicated TCI state. In some embodiments, the plurality of physical data channels can carry different redundancy versions (RVs) of a single data block. In some embodiments, the plurality of physical data channels can be respective layers of a physical downlink shared channel (PDSCH) or a physical uplink shared channel (PUSCH). In other embodiments, each physical data channel can be a subset of all layers of a PDSCH or a PUSCH.

Other exemplary embodiments include methods (e.g., procedures) for transmitting or receiving a plurality of physical data channels with a single user equipment (UE). These exemplary methods can be performed by a wireless network (e.g., NG-RAN) comprising one or more nodes (e.g., base stations, gNBs, en-gNBs, TRPs, etc., or components thereof) that are in communication with the UE (e.g., wireless device, IoT device, modem, etc. or component thereof).

In some embodiments, these exemplary methods can include transmitting, to the UE, an indication of a plurality of Transmission Configuration Indicator (TCI) states, with each state including a plurality of source RS pairs. For example, the wireless network can provide the UE with a configuration (e.g., via RRC) of 64 configured TCI states, each with two or more source RS pairs. In some embodiments, these exemplary methods can also include transmitting, to the UE, a control message (e.g., via MAC CE) that activates at least a subset of the plurality of states that were previously indicated and/or configured (e.g., eight activated TCI states).

In some embodiments, these exemplary methods can also include transmitting, to the UE, an indication of a plurality of antenna ports for demodulation reference signals (DM-RS), where each antenna port is mapped to a CDM group associated with one of the physical data channels.

These exemplary methods can also include transmitting, to the UE, an indication of a TCI state that includes one or more source RS pairs, with each source RS pair having a corresponding pair of quasi-colocation (QCL) relations with antenna ports, for DM-RS, that are mapped to a plurality of code-division multiplexing (CDM) groups. In some embodiments, the indicated TCI can be one of the plurality of TCI states previously indicated and/or configured. In some embodiments, each corresponding QCL relation can be based on one or more of the following: Doppler shift, Doppler spread, average delay, delay spread, and spatial reception.

In some embodiments, the DM-RS can be Type-1, and the indicated TCI state can include no more than two source RS pairs. In other embodiments, the DM-RS can be Type-2, and the indicated TCI state can include no more than three source RS pairs.

In some embodiments, the indicated TCI state includes a single source RS pair, and the single source RS pair has a corresponding pair of QCL relations with all of the plurality of antenna ports.

In some embodiments, the indicated TCI state includes a first source RS pair having a corresponding first pair of QCL relations with all antenna ports associated with a first CDM group, and a second source RS pair having a corresponding second pair of QCL relations with all antenna ports associated with a second CDM group. In such embodiments, the number of antenna ports associated with the first CDM group can be different than the number of antenna ports associated with the second CDM group.

In some of these embodiments, the first and second CDM groups can be associated with respective first and second indices, where the first index is less than the second index. In such embodiments, these exemplary methods can also include transmitting, to the UE, scheduling information for the physical data channels, where the scheduling information includes the first and second indices associated with the respective first and second CDM groups.

In other of these embodiments, the indicated TCI state can also include a third source RS pair having a corresponding third pair of QCL relations with all antenna ports associated with a third CDM group. In such case, the first, second, and third CDM groups can be associated with respective first, second, and third sources in the wireless network.

In other of these embodiments, the indicated TCI state can identify a first TCI state including the first source RS pair and a second TCI state including the second source RS pair. In yet other embodiments, the indicated TCI state can be one of a symmetric pair of TCI states, with each TCI state of the symmetric pair including first and second source RS pairs. Moreover, each TCI state of the symmetric pair can have different QCL relations between the first and second source RS pairs and antenna ports that are mapped to first and second CDM groups.

In yet other embodiments, the indicated TCI state can include first and second source RS pairs. The first source RS pair can have a corresponding pair of QCL relations with the antenna ports mapped to a first CDM group, and the second source RS pair can have a corresponding pair of QCL relations with antenna ports mapped to second and third CDM groups.

These exemplary methods can also include transmitting the plurality of physical data channels to, or receiving the plurality of physical data channels from, the UE based on the QCL relations for the one or more source RS pairs of the indicated TCI state. In some embodiments, the plurality of physical data channels can carry different redundancy versions (RVs) of a single data block. In some embodiments, the plurality of physical data channels can be respective layers of a physical downlink shared channel (PDSCH) or a physical uplink shared channel (PUSCH). In other embodiments, each physical data channel can be a subset of all layers of a PDSCH or a PUSCH.

Other exemplary embodiments include user equipment (UEs, e.g., wireless devices, IoT devices, or components thereof, such as a modem) and wireless networks comprising one or more nodes (e.g., base stations, eNBs, gNBs, CU/DUs, TRPs, etc. or components thereof) configured to perform operations corresponding to any of the exemplary methods described herein. Other exemplary embodiments include non-transitory, computer-readable media storing program instructions that, when executed by processing circuitry, configure such UEs or wireless networks to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 8, which includes

DETAILED DESCRIPTION

Figure 1:
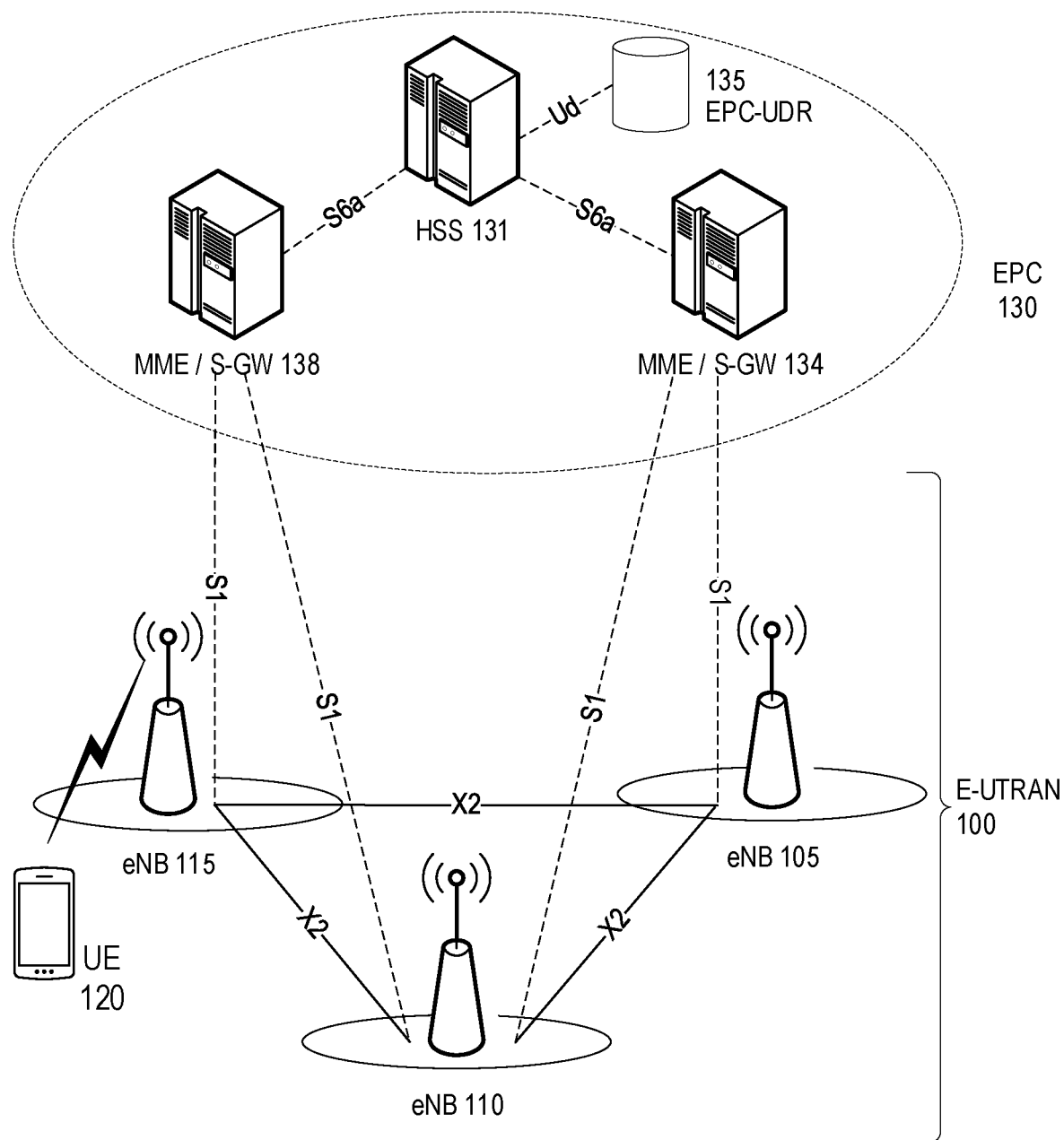
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
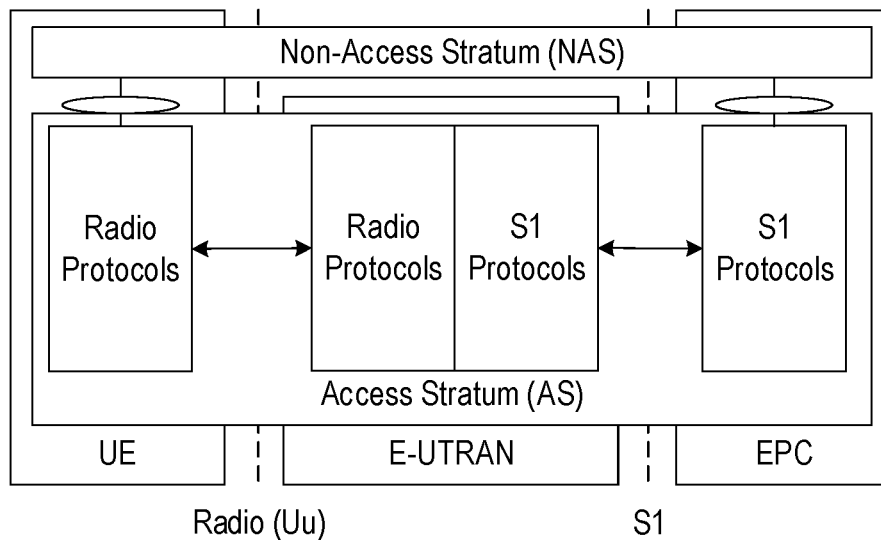
FIG. 2A is a high-level block diagram of an exemplary E-UTRAN architecture in terms of its constituent components, protocols, and interfaces.
Figure 2B:
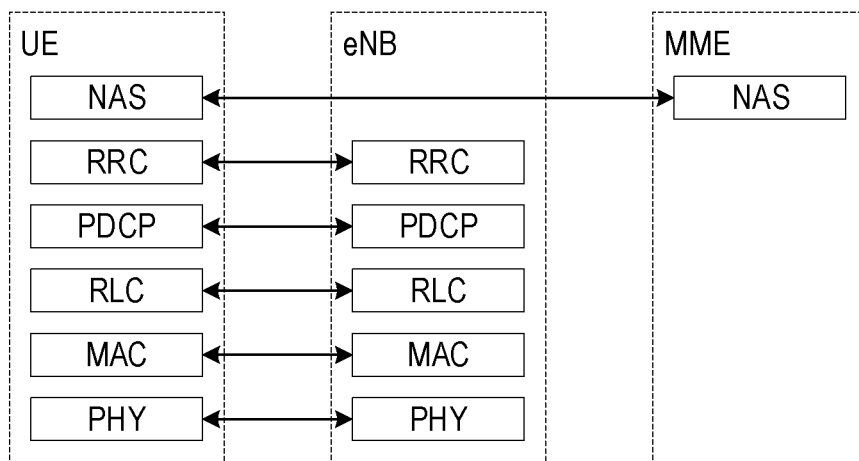
FIG. 2B is a block diagram of exemplary protocol layers of the control-plane portion of the radio (Uu) interface between a user equipment (UE) and the E-UTRAN.
Figure 2C:
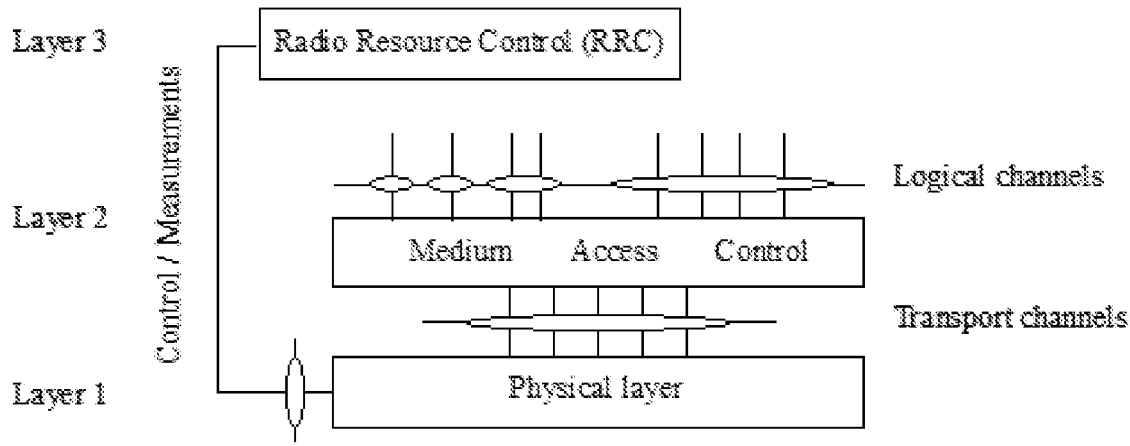
FIG. 2C is a block diagram of an exemplary LTE radio interface protocol architecture from the perspective of the PHY layer.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, various terms discussed below will be used throughout the application.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

The term "radio network node" can refer to any type of network node that can comprise any type of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU), Remote Radio Head (RRH).

In some embodiments, a TRP may be associated with a network node or radio network node. In some embodiments, a multi-TRP scenario may include more than one TRPs associated with one or more network nodes.

Note that although terminology from one particular wireless system (e.g., LTE and/or NR) may be used herein, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Unless otherwise noted, the terms "wireless device" (or "WD" for short) and "user equipment" (or "UE" for short) are used interchangeably. A WD can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, a Narrowband IoT (NB-IOT) device, aerial device (e.g., drone), ProSe UE, V2V UE, V2X UE, etc.

Unless otherwise noted, functions described herein as being performed by a WD, UE, network node, radio network node, etc. can be distributed over a plurality of devices and/or network nodes. In other words, it is contemplated that the functions of the network node and WD described herein are not limited to performance by a single physical device and, in fact, can be distributed among several physical devices.

Unless otherwise noted, the term "time resource" can correspond to any type of physical resource or radio resource expressed in terms of length of time or time interval or time duration. In some embodiments, the term "slot" is used to indicate a radio resource; however, it should be understood that the techniques described herein may advantageously be used with other types of radio resources, such as any type of physical resource or radio resource expressed in terms of length of time. Examples of time resources are: symbol, time slot, minislot, subframe, radio frame, transmission time interval (TTI), interleaving time, a time resource number, etc.

Unless otherwise noted, the term "TTI" can correspond to any time period over which a physical channel can be encoded and interleaved for transmission (e.g., during the TTI). The physical channel can be decoded by the receiver over the same time period (T0) over which it was encoded. The TTI may also interchangeably called as short TTI (sTTI), transmission time, slot, sub-slot, mini-slot, short subframe (SSF), mini-subframe etc.

In some embodiments, a transmitter (e.g., network node) and a receiver (e.g., WD) can have a common, predetermined understanding about rule(s) for determining which resources to be arranged for transmission and/or reception of one or more physical channels. Such rules may, in some embodiments, be referred to as "mapping." In other embodiments, the term "mapping" may have other meanings.

Unless otherwise noted, the term "channel" can refer to a logical, transport, or physical channel. A channel may comprise and/or be arranged on one or more carriers, e.g., a plurality of subcarriers. A channel carrying and/or for carrying control signaling/control information may be considered a control channel, in particular if it is a physical layer channel and/or if it carries control plane information. Analogously, a channel carrying—and/or for carrying—data signaling/user information may be considered a data channel (e.g., PDSCH), in particular if it is a physical layer channel and/or if it carries user plane (UP) information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G/NR) beams may be used instead of cells and, as such, concepts described herein apply equally to both cells and beams.

As briefly mentioned above, it has been discussed to support multi-source transmission of PDSCH to UEs for NR Rel-16. In this context, the term "source" can refer to a beam, a panel, a transmission/reception point (TRP), etc. For example, to support URLLC, it can be beneficial to transmit multiple versions of a transport block (TB) to a UE from different TRPs, also referred to as "multi-TRP diversity." However, current techniques for conveying (e.g., to a UE) single-source transmission configurations have various problems, drawbacks, and/or limitations when trying to extend them to cover a range of transmission sources (e.g., one to three) rather than just a single source. This is discussed in more detail below.

In Rel-15 NR, a UE can be configured with up to four carrier bandwidth parts (BWPs) in the downlink (DL) with a single DL carrier BWP being active at a given time. A UE can also be configured with up to four uplink (UL) carrier BWPs with a single UL carrier BWP being active at a given time. If a UE is configured with a supplementary UL, the UE can be configured with up to four additional carrier BWPs in the supplementary UL, with a single supplementary UL carrier BWP being active at a given time.

Figure 5:
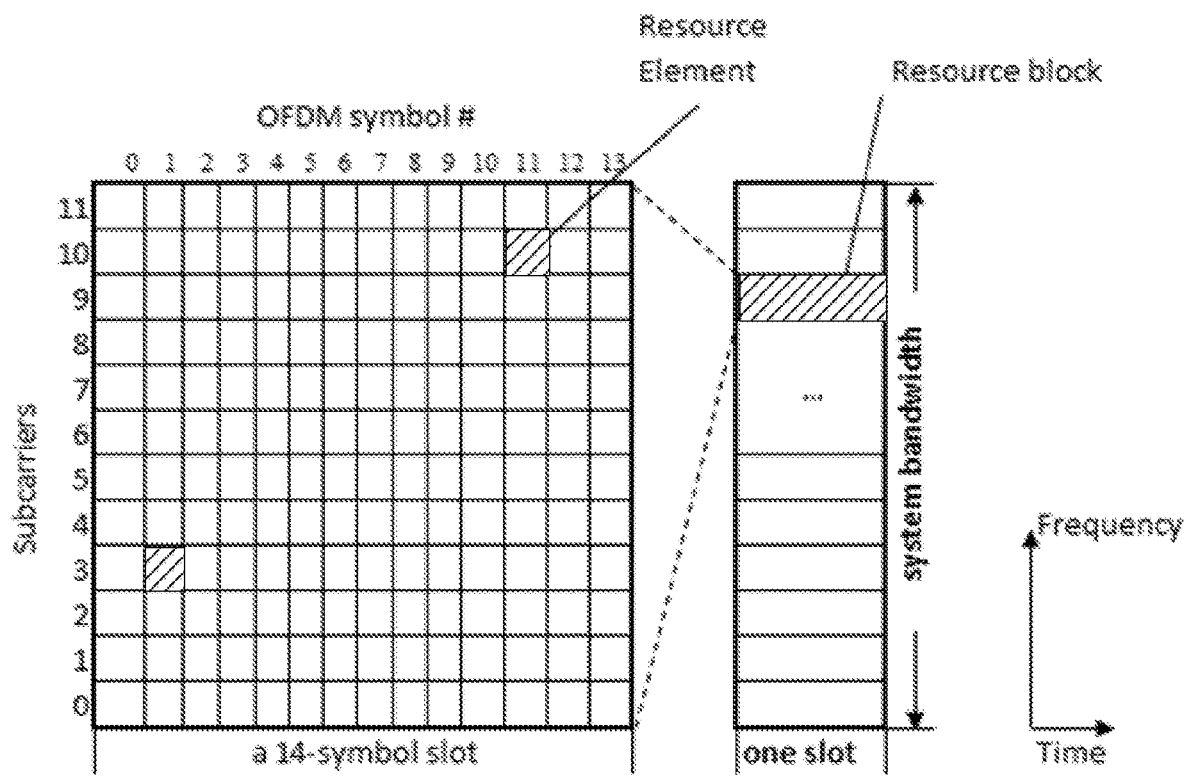
FIG. 5 shows an exemplary time-frequency resource grid for an NR slot.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP,i}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15\times 2^{\mu})$ kHz, where $\mu \in (0, 1, 2, 3, 4)$ are referred to as "numerologies." Numerology $\mu=0$ (i.e., $\Delta f=15$ kHz) provides the basic (or reference) SCS that is also used in LTE. The slot length is inversely related to SCS or numerology according to $\frac{1}{2}^{\mu}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^{\mu}*180$ kHz.

Table 1 below summarizes the supported NR numerologies and associated parameters. Different DL and UL numerologies can be configured by the network.

TABLE 1

| $\mu$ | $\Delta f = 2^{\mu} \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

Figure 6A:
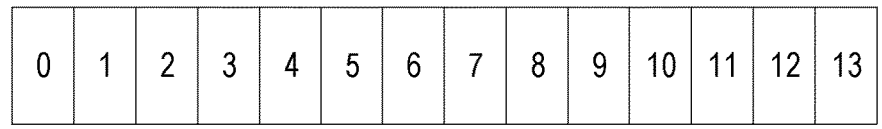
FIGS. 6A-6B shows various exemplary NR slot configurations.

An NR slot can include 14 OFDM symbols for normal cyclic prefix and 12 symbols for extended cyclic prefix. FIG. 6A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 6B:
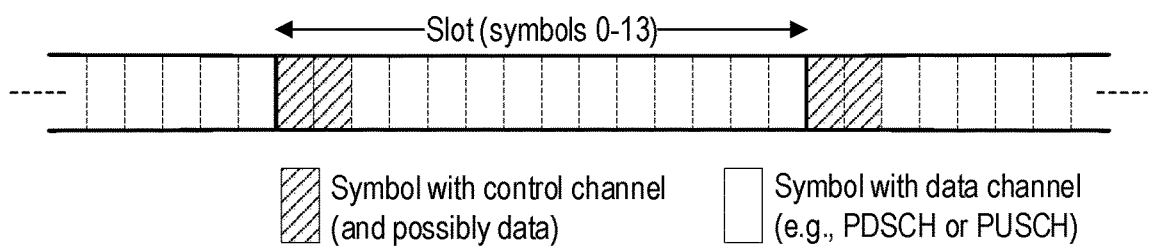

FIG. 6B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

Figure 4:
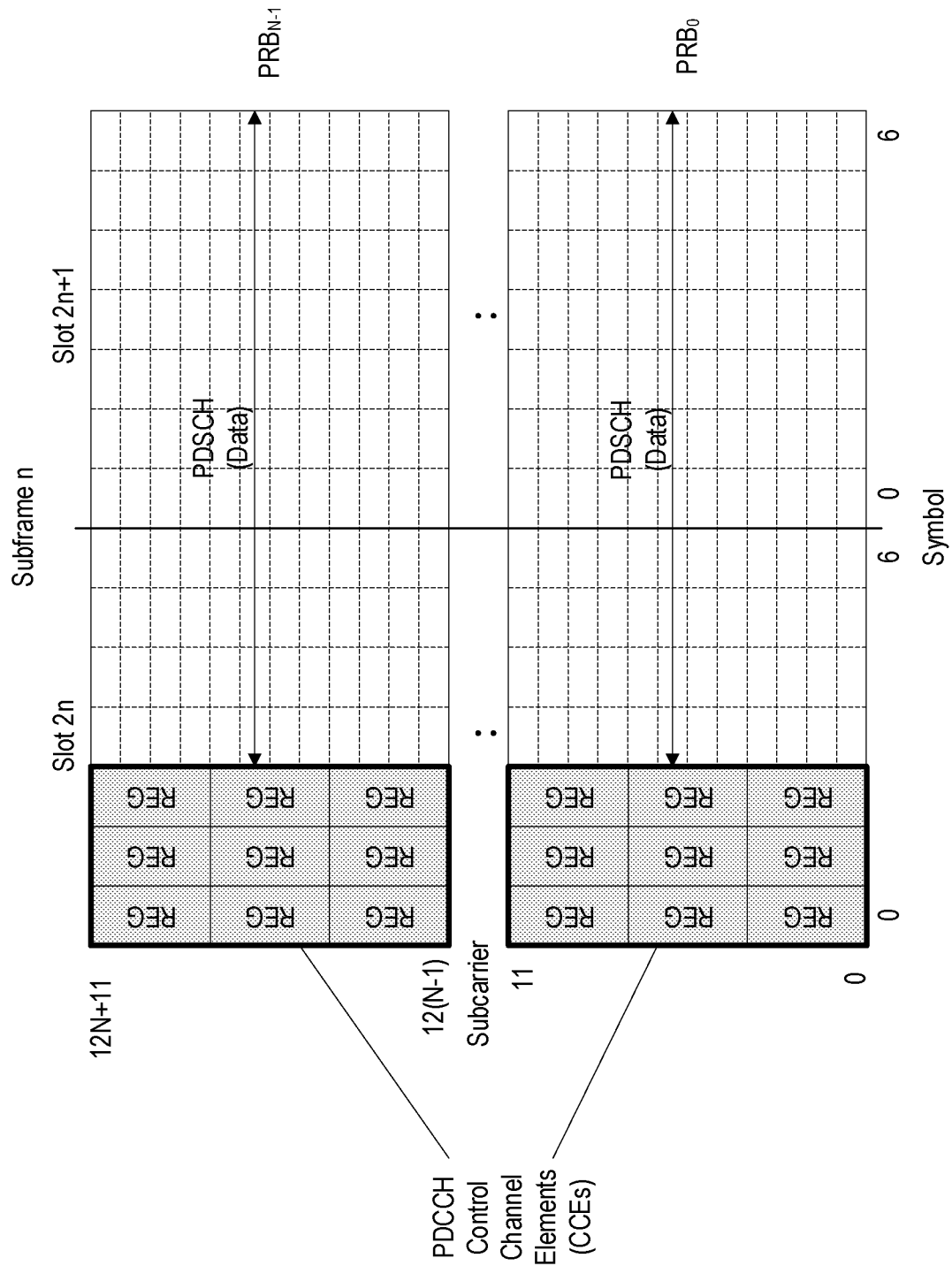
FIG. 4 shows an exemplary manner in which the CCEs and REGs can be mapped to a physical resource.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in LTE subframe, such as illustrated in FIG. 4. In NR, however, each REG consists of all 12 REs of one OFDM symbol in a RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 6 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while Other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

Finally, DCI format 0_1 can also include a network request for a UE report of channel state information (CSI) or channel quality information (CQI). Prior to sending this report, the UE receives and measures CSI-RS transmitted by the network. The parameter aperiodicTriggeringOffset represents the integer number of slots between the UE's reception of a DCI including a CSI request and the network's transmission of the CSI-RS. This parameter can take on values 0-4.

In addition to dynamic scheduling on a per-slot basis, discussed above, NR also supports semi-persistent scheduling in the DL. In this approach, the network configures a periodicity of PDSCH transmission via RRC and then controls the start and stop of transmissions via DCI in PDCCH. One advantage of this technique is reduction of control signaling overhead on PDCCH.

NR also supports a similar feature on the UL, referred to as configured grants (CG). In general, CG type 2 is similar to DL semi-persistent scheduling in downlink (e.g., RRC plus DCI) while CG type 1 is controlled by only RRC, including the start and stop of transmissions.

Figure 7:
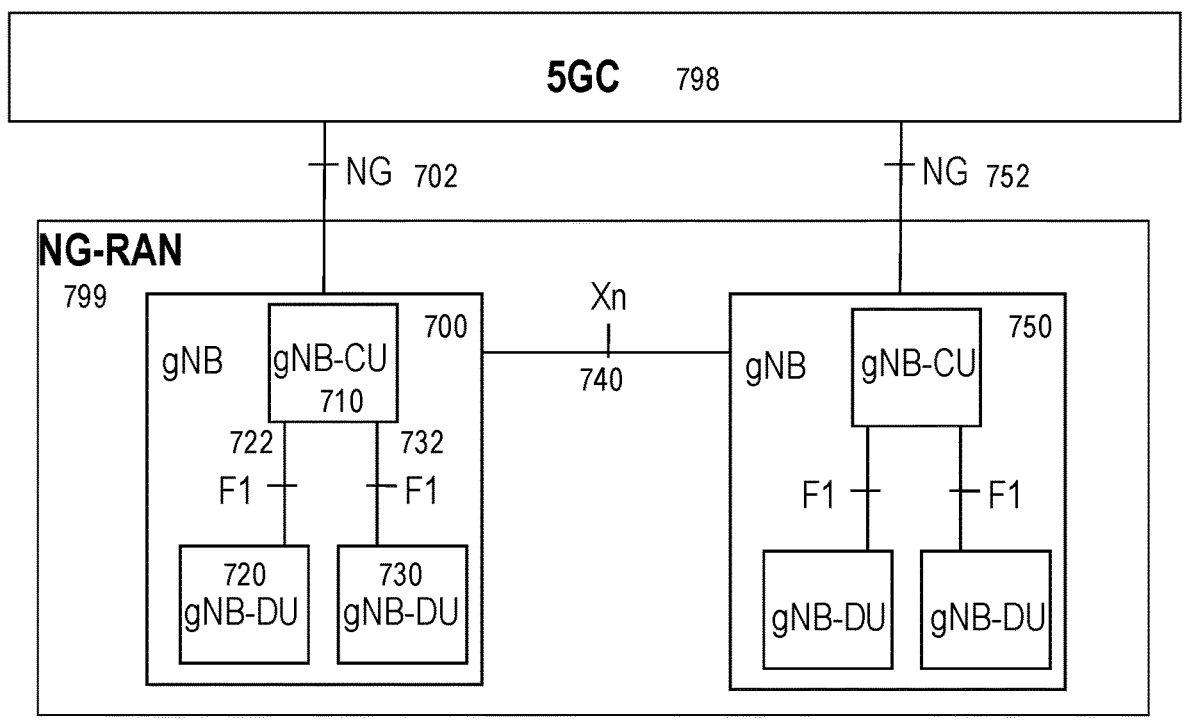
FIG. 7 illustrates a high-level view of a 5G network architecture.

FIG. 7 illustrates a high-level view of the 5G network architecture, consisting of a Next Generation RAN (NG-RAN) 799 and a 5G Core (5GC) 798. NG-RAN 799 can include a set of gNodeB's (gNBs) connected to the 5GC via one or more NG interfaces, such as gNBs 700, 750 connected via interfaces 702, 752, respectively. In addition, the gNBs can be connected to each other via one or more Xn interfaces, such as Xn interface 740 between gNBs 700 and 750. With respect to the NR interface to UEs, each of the gNBs can support frequency division duplexing (FDD), time division duplexing (TDD), or a combination thereof.

The NG RAN logical nodes shown in FIG. 7 (and described in 3GPP TS 38.401 and 3GPP TR 38.801) include a central (or centralized) unit (CU or gNB-CU) and one or more distributed (or decentralized) units (DU or gNB-DU). For example, gNB 700 in FIG. 7 includes gNB-CU 710 and gNB-DUs 720 and 730. CUs (e.g., gNB-CU 710) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 3A:
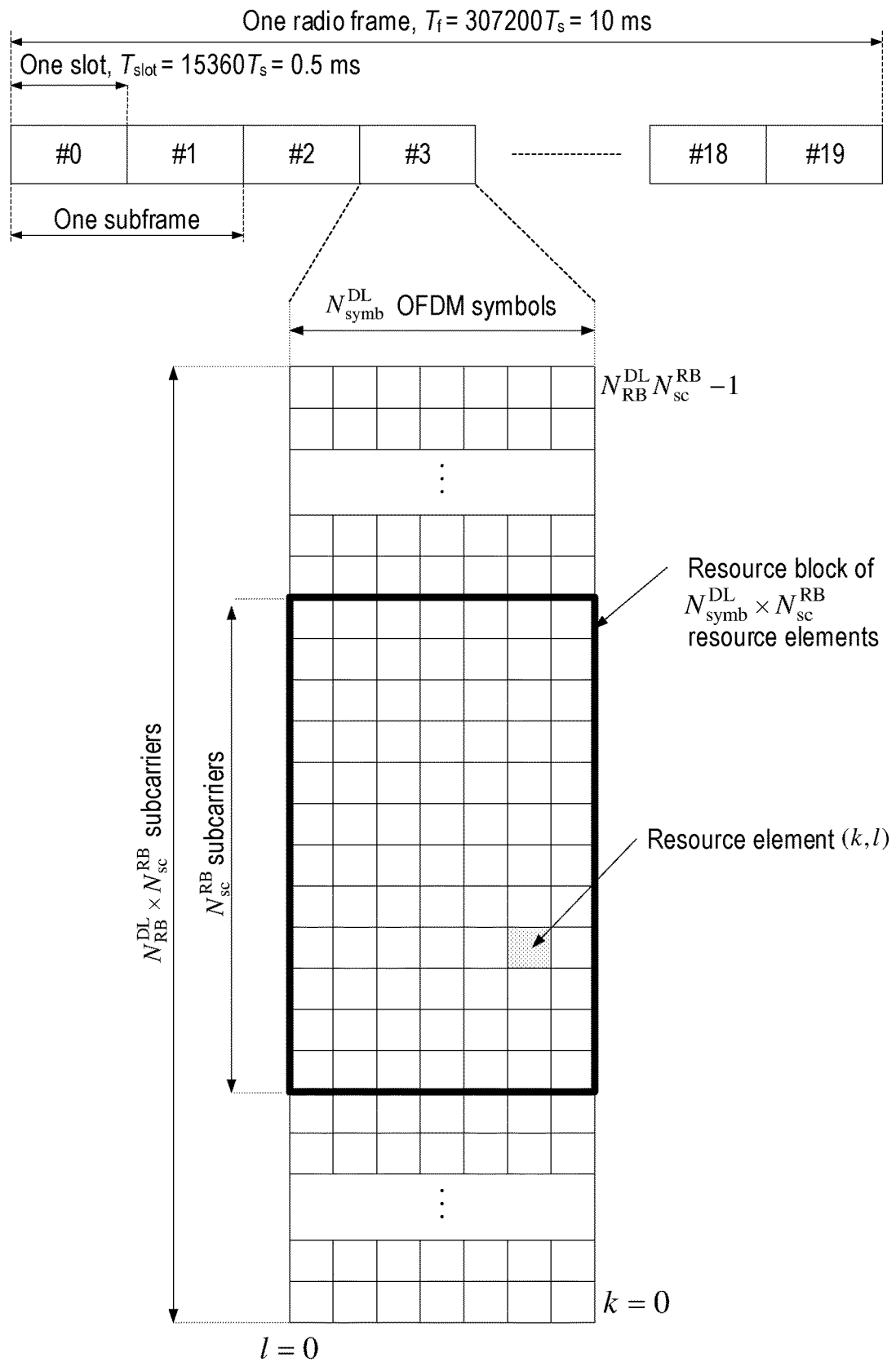
FIGS. 3A and 3B are block diagrams, respectively, of exemplary downlink and uplink LTE radio frame structures used for frequency division duplexing (FDD) operation.
Figure 3B:
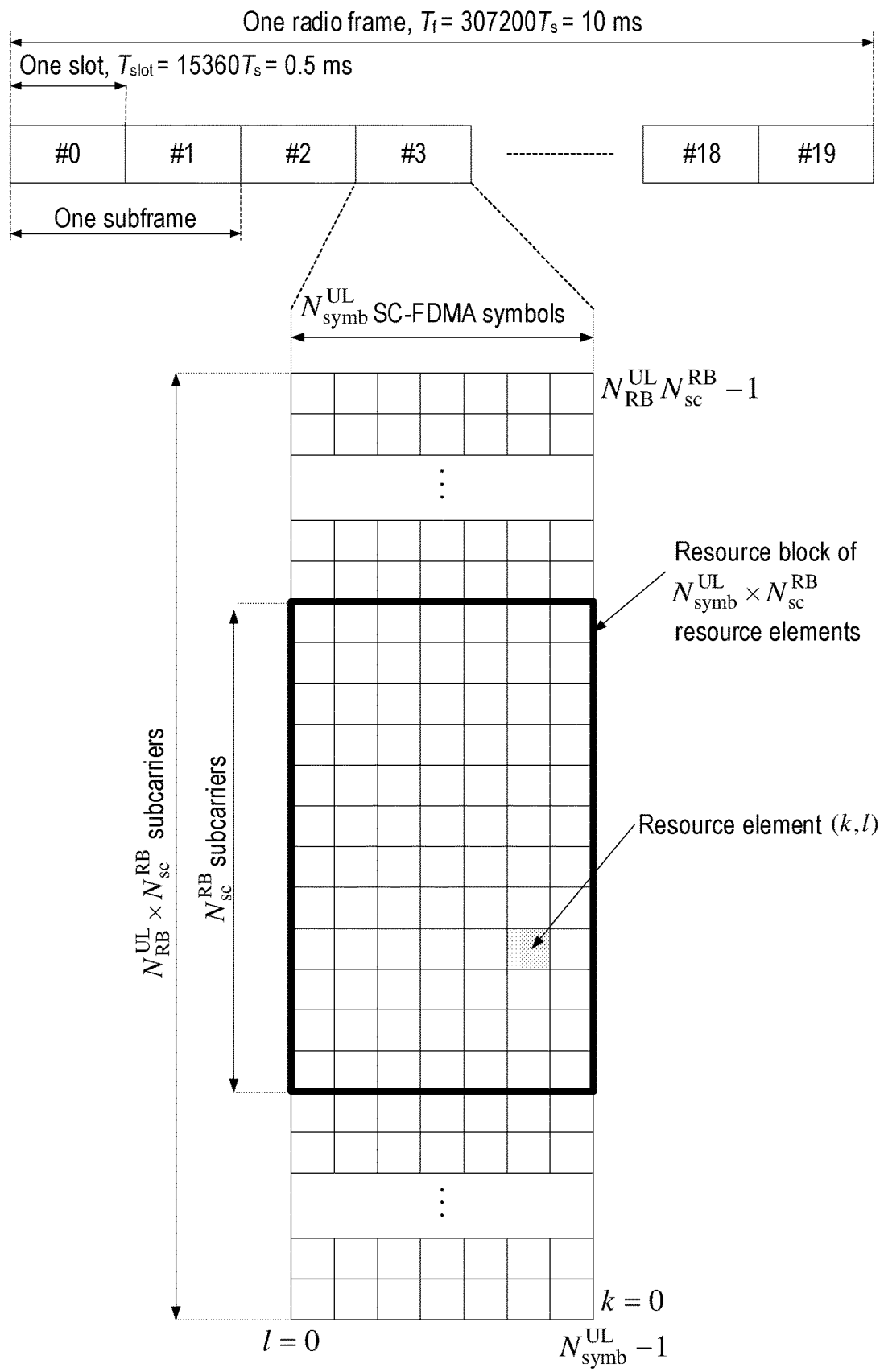

A gNB-CU connects to gNB-DUs over respective F1 logical interfaces, such as interfaces 722 and 732 shown in FIG. 3. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

Several signals can be transmitted from the same base station (e.g., gNB) antenna from different antenna ports. These signals can have the same large-scale properties, for instance in terms of Doppler shift/spread, average delay spread, or average delay. These antenna ports are then said to be "quasi co-located" or "QCL," The network can signal to the UE that two antenna ports are QCL. Once the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement reference signal such as CSI-RS (referred to as "source RS") and the second antenna port is a demodulation reference signal (DMRS) (referred to as "target RS").

For instance, if antenna ports A and B are QCL with respect to average delay, the UE can estimate the average delay from the signal received from antenna port A (source RS) and assume that the signal received from antenna port B (target RS) has the same average delay. This can be useful for demodulation since the UE can know beforehand the properties of the channel when trying to measure the channel utilizing the DMRS.

Information about what assumptions can be made regarding QCL is signaled to the UE from the network. In NR, the following four types of QCL relations between a transmitted source RS and transmitted target RS are defined:

Type A: {Doppler shift, Doppler spread, average delay, delay spread}
Type B: {Doppler shift, Doppler spread}
Type C: {average delay, Doppler shift}
Type D: {Spatial Rx parameter}

QCL type D was introduced to facilitate beam management with analog beamforming and is known as "spatial QCL." There is currently no strict definition of spatial QCL, but the understanding is that if two transmitted antenna ports are spatially QCL, the UE can use the same Rx beam to receive them. When a QCL relation is signaled to a UE, it includes not only information about the particular QCL type (e.g., A, B, C, or D), but also a serving cell index, a BWP index, and a source reference signal identity (CSI-RS, TRS or SSB).

QCL Type D is the most relevant for beam management, but it is also necessary to convey a Type A QCL RS relation to UEs so they can estimate all the relevant large scale parameters. Typically this can be done by configuring a UE with a tracking reference signal (TRS, e.g., a CSI-RS) for time/frequency offset estimation. To be able to use any QCL reference, the UE would have to receive it with a sufficiently good signal-to-interference-plus-noise ratio (SINR). In many cases, this constrains the TRS for a particular UE to be transmitted in a particular beam and/or beam configuration.

To introduce dynamics in beam and TRP selection, the UE can be configured through RRC signaling (e.g., using a TCI-State IE) with N Transmission Configuration Indicator (TCI) states, where N is up to 128 in frequency range 2 (FR2) and up to eight in FR1, depending on UE capability. Each configured TCI state contains parameters for the QCL associations between source RS (e.g., CSI-RS or SS/PBCH) and target RS (e.g., PDSCH/PDCCH DMRS antenna ports). TCI states can also be used to convey QCL information for the reception of CSI-RS. Each of the N states in the list of TCI states can be interpreted as a list of N possible beams transmitted from the network, or a list of N possible TRPs used by the network to communicate with the UE.

More specifically, each TCI state can contain an ID along with QCL information for one or two source DL RSs, with each source RS associated with a QCL type, a serving cell index, a BWP index, and a source reference signal identity (CSI-RS, TRS or SSB). For example, two different CSI-RSs {CSI-RS1, CSI-RS2} can be configured in the TCI state as {qcl-Type1, qcl-Type2}={Type A, Type D}. The UE can interpret this TCI state to mean that the UE can derive Doppler shift, Doppler spread, average delay, delay spread from CSI-RS1, and Spatial Rx parameter (e.g., RX beam to use) from CSI-RS2. In case QCL Type D is not applicable (e.g., low- or mid-band operation), then a TCI state contains only a single source RS. Unless specifically noted, however, references to "pairs" of source RS includes the case of a single source RS.

Furthermore, a first list of available TCI states can be configured for PDSCH, and a second list can be configured for PDCCH. This second list can contain pointers, known as TCI State IDs, to a subset of the TCI states configured for PDSCH. For the UE operating in FR1, the network then activates one TCI state for PDCCH (i.e., by providing a TCI to the UE) and up to eight TCI states for PDSCH, depending on UE capability.

As an example, a UE can be configured with four active TCI states from a list of 64 total configured TCI states. Hence, the other 60 configured TCI states are inactive and the UE need not be prepared to estimate large-scale parameters for those. On the other hand, the UE continuously tracks and updates the large-scale parameters for the four active TCI states by performing measurements and analysis of the source RSs indicated for each of those four TCI states. Each DCI used for PDSCH scheduling includes a pointer to one active TCI for the scheduled UE. Based on this pointer, the UE knows which large-scale parameter estimate to use when performing PDSCH DMRS channel estimation and PDSCH demodulation.

An NR UE can receive (e.g., in the DCI scheduling a PDSCH) an indication of the TCI state and an indication of the time offset between the reception of the DCI and the corresponding PDSCH. If a TCI state is indicated in DCI scheduling the PDSCH, the UE uses the indicated TCI state for determining the PDSCH DMRS antenna ports' QCL if the duration between the reception of the DCI and the scheduled time for receiving the corresponding PDSCH is greater than or equal to the value of Threshold-Sched-Offset, a UE-specific parameter that depends on the UE's capabilities. In Rel-15 NR, the UE reports its Threshold-Sched-Offset to the network.

On the other hand, if the duration between the reception of the DCI and the corresponding PDSCH reception is less than the value of Threshold-Sched-Offset, the UE can assume that the PDSCH DMRS antenna port(s) are QCL with the RS(s) in the TCI state that is activated for PDCCH, so long as at least one of the configured TCI states contains 'QCL-TypeD'. If none of the configured TCI states contains 'QCL-TypeD', the UE uses the TCI state indicated in the PDSCH-scheduling DCI for determining the PDSCH DMRS antenna ports' QCL, irrespective of the duration between the reception of the DCI and the reception of the corresponding PDSCH.

Demodulation reference signals (DM-RS) facilitate the coherent demodulation of physical layer data channels (e.g., PDSCH by the UE, PUSCH by the network) and PDCCH (e.g., by the UE). Each DM-RS is associated with one of these physical-layer channels and, as such, is confined to resource blocks carrying the associated physical layer channel. Each DM-RS is mapped on allocated REs of the time-frequency grid such that the receiver can efficiently handle time- and/or frequency-selective fading radio channels.

The mapping of DM-RS to REs is configurable in both frequency and time domains, with two mapping types in the frequency domain (configuration type 1 or type 2) and two mapping types in the time domain (mapping type A or type B) defining the position of the first DM-RS within a transmission interval. The DM-RS mapping in time domain can also be single-symbol-based or double-symbol-based (i.e., pair of adjacent symbols). Furthermore, a UE can be configured with one, two, three or four single-symbol DM-RS and one or two double-symbol DM-RS. In scenarios with low Doppler, it may be sufficient to configure front-loaded DM-RS only (i.e., one single- or double-symbol DM-RS), while additional DM-RS will be required in scenarios with high Doppler.

Figure 8A:
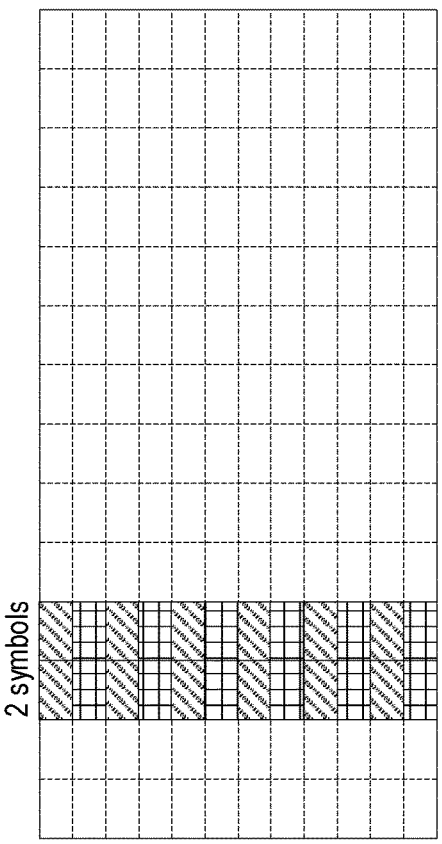
FIGS. 8A-8D, shows four exemplary mappings of front-loaded demodulation reference signals (DM-RS).
Figure 8B:
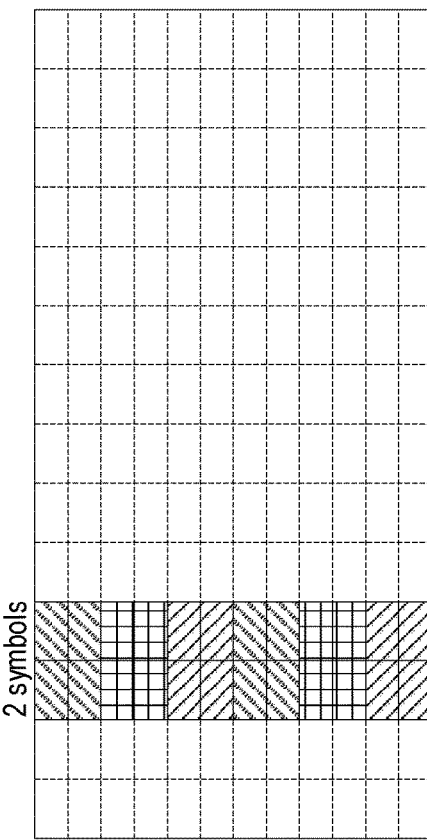
Figure 8C:
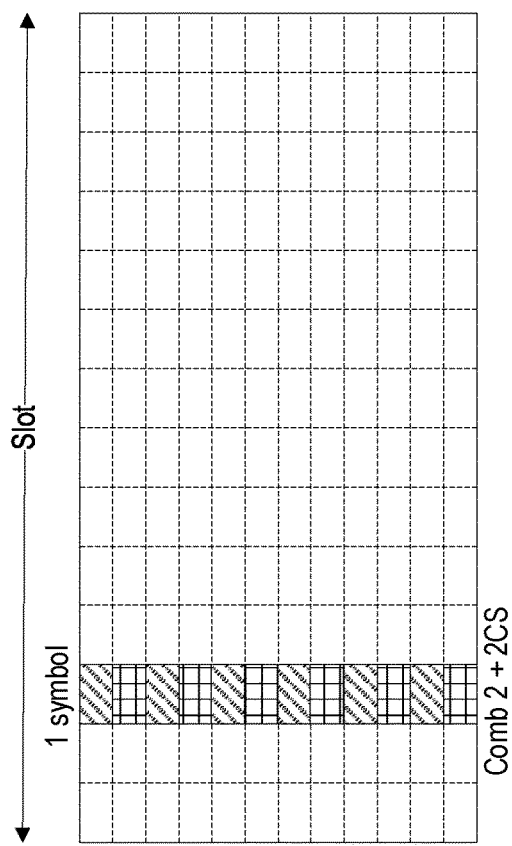
Figure 8D:
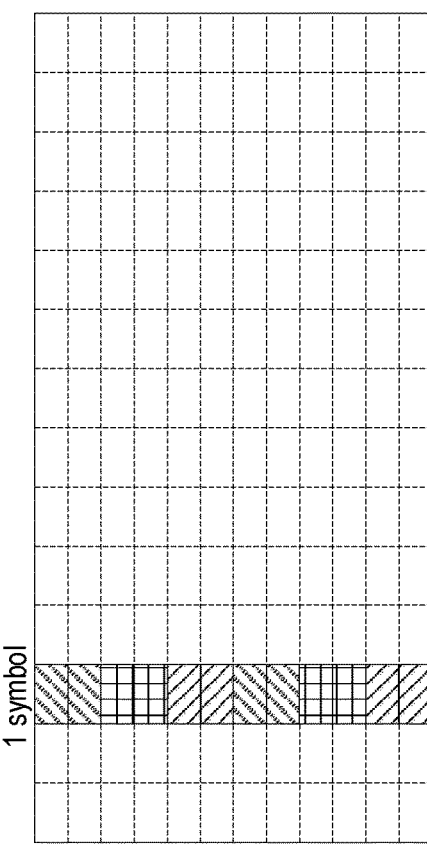

FIG. 8, which includes FIGS. 8A-8D, shows four exemplary mappings of front-loaded DM-RS with type-A time-domain mapping, in which the first DM-RS is in the third symbol of 14-symbol slot. More specifically, FIGS. 8A-8B show mappings for configuration type 1 for single-symbol and double-symbol DM-RS, respectively. Likewise, FIGS. 8C-8D show mappings for configuration type 2 for single-symbol and double-symbol DM-RS, respectively. As illustrated in FIG. 8, type 1 and type 2 mapping differ with respect to both the mapping structure and the number of supported DM-RS CDM groups. As illustrated by the different shadings of the DM-RS REs, type 1 supports two CDM groups (e.g., λ=0, 1) and type 2 supports three CDM groups (e.g., λ=0, 1, 2).

The mapping structure of type 1 is sometimes referred to as a 2-comb structure with two CDM groups defined, in frequency domain, by the set of subcarriers {0, 2, 4, ... } and {1, 3, 5, ... }. Since it facilitates low peak-to-average power ratio (PAPR) transmissions, the comb mapping structure is used in conjunction with DFT-S-OFDM in the NR UL. In contrast, both type 1 and type 2 mapping are supported for CP-OFDM operation (e.g., in UL and DL).

A DM-RS antenna port is mapped to the REs within one CDM group only. For single-symbol DM-RS, two antenna ports can be mapped to each CDM group, while for double-symbol DM-RS, four antenna ports can be mapped to each CDM group. Hence, the maximum number of DM-RS ports either four or eight for type 1, and either six or twelve for type 2. A length-two orthogonal cover code (OCC) ([+1, +1], [+1, −1]) is used to separate antenna ports mapped on same REs within a CDM group. The OCC is applied in frequency domain as well as in time domain when double-symbol DM-RS is configured.

In NR Rel-15, the mapping of a PDSCH DM-RS sequence r(m), m=0, 1, ... on antenna port $p_j$ and subcarrier k in OFDM symbol l for the numerology index μ is specified in 3GPP TS 38.211 according to:

$$a_{k,l}^{(p_j,\mu)} = \beta_{DMRS}^{PDSCH} r_\lambda^{(p_j)}(2n+k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, ...$$

where $$r_\lambda^{(p_j)}(2n+k') = w_f(k')w_t(l')(2n+k')$$

represents the reference signal mapped on port $p_j$ in CDM group □ after applying OCC in frequency domain, $w_f(k')$, and time domain, $w_t(l')$. Tables 2-3 below show the PDSCH DM-RS mapping parameters for configuration type 1 and type 2, respectively.

TABLE 2

| p | CDM group λ | Δ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 3

| p | CDM group λ | Δ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

DCI also includes a bit field that indicates which antenna ports (i.e., the number of data layers) are scheduled. For example, if DMRS port 1000 is indicated by the DCI, then the PDSCH is a single layer transmission and the UE will use the DMRS defined by port 1000 to demodulate the PDSCH. The DCI value also indicates the number of CDM groups without data, which means that if 1 is indicated, the other CDM group contains data for the UE (PDSCH case), and if 2 is indicated, both CDM groups may contains DMRS ports and no data is mapped to the OFDM symbol containing the DMRS. Table 4 below shows bit-field values and corresponding configurations for DM-RS Type 1 with a single, front-loaded DM-RS (maxlength=1). Note that the DMRS port(s) values shown in Table 4 are modulo-1000 versions of the p values given in Table 2.

TABLE 4

| | Codeword 0 enabled, Codeword 1 disabled | |
|---|---|---|
| DCI value | No. of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |

TABLE 4-continued

| | Codeword 0 enabled, Codeword 1 disabled | |
|---|---|---|
| DCI value | No. of DMRS CDM group(s) without data | DMRS port(s) |
| 9 | 2 | 0-2 |
| 10 | 2 | 0-3 |
| 11 | 2 | 0, 2 |
| 12-15 | Reserved | Reserved |

For DMRS Type 1, ports 1000, 1001, 1004, and 1005 are in CDM group $\lambda=0$ and ports 1002, 1003, 1006, and 1007 are in CDM group $\lambda=1$ (also illustrated in Table 2). Table 5 shows a corresponding exemplary configuration for DMRS Type 2 (maxlength=1). For DMRS Type 2, ports 1000, 1001, 1006, and 1007 are in CDM group $\lambda=0$; ports 1002, 1003, 1008, and 1009 are in CDM group $\lambda=1$; and ports 1004, 1005, 1010, and 1011 are in CDM group $\lambda=2$ (also illustrated in Table 3). Note that the DMRS port(s) values shown in Table 5 are modulo-1000 versions of the p values given in Table 3.

TABLE 5

| Codeword 0 enabled, Codeword 1 disabled | | | Codeword 0 enabled, Codeword 1 enabled | | |
|---|---|---|---|---|---|
| DCI Value | DMRS CDM group(s) w/o data | DMRS port(s) | DCI Value | DMRS CDM group(s) w/o data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |

TABLE 5-continued

| Codeword 0 enabled, Codeword 1 disabled | | | Codeword 0 enabled, Codeword 1 enabled | | |
|---|---|---|---|---|---|
| DCI Value | DMRS CDM group(s) w/o data | DMRS port(s) | DCI Value | DMRS CDM group(s) w/o data | DMRS port(s) |
| 22 | 3 | 0-3 | | | |
| 23 | 2 | 0, 2 | | | |
| 24-31 | Reserved | Reserved | | | |

Tables 6 and 7 below show corresponding exemplary configurations for DMRS Type 1 (maxlength=2) and DMRS Type 2 (maxlength=2), respectively. Note that the DMRS port(s) values shown in Tables 6-7 are modulo-1000 versions of the p values given in Tables 2-3, respectively.

TABLE 6

| Codeword 0 enabled, Codeword 1 disabled | | | | Codeword 0 enabled, Codeword 1 enabled | | | |
|---|---|---|---|---|---|---|---|
| DCI Value | DMRS CDM group(s) w/o data | DMRS port(s) | Front-load symbs. | DCI Value | DMRS CDM group(s) w/o data | DMRS port(s) | Front-load symbs. |
| 0 | 1 | 0 | 1 | 0 | 2 | 0-4 | 2 |
| 1 | 1 | 1 | 1 | 1 | 2 | 0-4, 6 | 2 |
| 2 | 1 | 0, 1 | 1 | 2 | 2 | 0-6 | 2 |
| 3 | 2 | 0 | 1 | 3 | 2 | 0-7 | 2 |
| 4 | 2 | 1 | 1 | 4-31 | Rsvd | Rsvd | Rsvd |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Rsvd | Rsvd | Rsvd | | | | |

TABLE 7

| Codeword 0 enabled, Codeword 1 disabled | | | | Codeword 0 enabled, Codeword 1 enabled | | | |
|---|---|---|---|---|---|---|---|
| DCI Value | DMRS CDM group(s) w/o data | DMRS port(s) | Front-load symbols | DCI Value | DMRS CDM group(s) w/o data | DMRS port(s) | Front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0-3, 6 | 2 |
| 3 | 2 | 0 | 1 | 3 | 2 | 0-3, 6, 8 | 2 |
| 4 | 2 | 1 | 1 | 4 | 2 | 0-3, 6-8 | 2 |
| 5 | 2 | 2 | 1 | 5 | 2 | 0-3, 6-9 | 2 |

TABLE 7-continued

| | Codeword 0 enabled, Codeword 1 disabled | | | | Codeword 0 enabled, Codeword 1 enabled | | |
|---|---|---|---|---|---|---|---|
| DCI Value | DMRS CDM group(s) w/o data | DMRS port(s) | Front-load symbols | DCI Value | DMRS CDM group(s) w/o data | DMRS port(s) | Front-load symbols |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |

Currently, the 3GPP NR specifications include a restriction that the UE may assume that the PDSCH DM-RS within the same CDM group are QCL with respect to Doppler shift, Doppler spread, average delay, delay spread, and spatial Rx. In cases where a first UE is not scheduled on all DMRS ports within a CDM group, another UE can be simultaneously scheduled for the remaining ports of that CDM group. The first UE can then estimate the channel for that other UE, which is seen by the first UE as an interfering signal. That facilitates coherent interference suppression by the first UE.

As mentioned above, multi-source transmission of PDSCH to UEs has been considered for 3GPP NR Rel-16. This can be used, for example, to improve URLLC performance by transmitting multiple copies of a PDSCH transport block (TB) to a UE from different TRPs, also referred to as "multi-TRP diversity." To support this feature, it has this been discussed to extend the TCI state from the Rel-15 pair of two source RS with QCL type 1 and type 2 (e.g., TCI state={qcl-Type1, qcl-Type2}), to an extended TCI state with two pairs A and B or even three pairs A, B, and C. These options can be expressed as:

TCI state={{qcl-Type1,qcl-Type2}$_A$,{qcl-Type1,qcl-Type2}$_B$}, and

TCI state={{qcl-Type1,qcl-Type2}$_A$,{qcl-Type1,qcl-Type2}$_B$,{qcl-Type1,qcl-Type2}$_C$}.

In the above, A, B, and C can represent three different TRPs, three different antenna panels at one gNB, or three different beams in case of FR2 operation (also referred to as "millimeter wave" or "mmW" for short).

After the NR PHY receives a transport block from the MAC layer, it converts the transport block into a codeword prior to transmission. At a high-level, this process involves applying a checksum, segmenting the transport block into code blocks, applying error protection (e.g., turbo coding) to each code block, then reassembling the code blocks into a codeword (CW). The NR PHY then converts the bits comprising the CW into modulation symbols (e.g., according to the modulation scheme currently in use), and then assigns the modulation symbols to one or more MIMO layers for spatial multiplexing. In some cases, the NR PHY can receive two transport blocks from the MAC for transmission in a single transmission interval and, accordingly, can produce one CW for each received transport block.

In NR, one CW can be assigned to up to four MIMO layers and two CWs are assigned to more than four layers. 3GPP TS 38.211 specifies how complex-valued modulation symbols $d^{(q)}(0), \ldots, d^{(q)}(M_{symb}^{(q)}-1)$ of codeword q can be mapped onto layers $x(i)=[x^{(0)}(i) \ldots x^{(\upsilon-1)}(i)]^T$, $i=0, 1, \ldots M_{symb}^{layer}-1$, where is the number of layers, $M_{symb}^{layer}$ is the number of modulation symbols per layer, and $M_{symb}^{(q)}$ is the number of modulation symbols per CW. Table 8 below (corresponding to 38.211 Table 7.3.1.3-1) shows an exemplary CW-to-layer mapping for NR spatial multiplexing. Furthermore, the blocks of vectors) $[x^{(0)}(i) \ldots x^{(\upsilon-1)}(i)]^T$, $i=0, 1, \ldots, M_{symb}^{layer}-1$ shown in Table 8 can be mapped to antenna ports according to the relation:

$$\begin{bmatrix} y^{(p_0)}(i) \\ \vdots \\ y^{(p_{\upsilon-1})}(i) \end{bmatrix} = \begin{bmatrix} x^{(0)}(i) \\ \vdots \\ x^{(\upsilon-1)}(i) \end{bmatrix}$$

where $i=0, 1, \ldots, M_{symb}^{ap}-1$, $M_{symb}^{ap}=M_{symb}^{layer}$. The set of antenna ports $\{p_0, \ldots, p_{\upsilon-1}\}$ can be determined according to Tables 4-7 above.

TRP transmission. However, current Rel. 15 NR antenna port indexing tables are asymmetric such that CDM group λ=0 always contains the most antenna ports. This is unsuitable for multi-TRP scheduling since one TRP (e.g., one source RS pair for QCL) is overrepresented in scheduling options.

Exemplary embodiments of the present disclosure can address these and other issues, problems, and/or difficulties by further associating each source RS pair (e.g., {qcl-Type1, qcl-Type2}) of a TCI state (or an extended TCI state) with a DM-RS CDM group. Furthermore, a TCI state can be individually configured (e.g., by RRC and/or MAC CE) to contain one, two, or three pairs of source RS QCL relations. In addition, conventional antenna port tables can be expanded to include new entries that facilitate simultaneous scheduling of transmissions from up to three TRPs (e.g., ports 1000, 1002, and 1004, together with indicating an extended TCI state with three pairs of source RS QCL relations, each pair associated with a port). Moreover, for scheduling an odd number of ports (e.g., layers), the expanded antenna port tables can also include multiple options for mapping these ports to particular TRPs (e.g., two ports to TRP1 and one to TRP2; one port to TRP1 and two to TRP2). Also, when a TCI state with fewer source RS pairs compared to the number of CDM groups is indicated in the scheduling DCI message, exemplary embodiments may provide techniques to determine which QCL source is applicable for each antenna port.

In this manner, embodiments can facilitate flexible and/or dynamic switching between single or multiple TRP transmission while providing legacy (e.g., Rel-15) compatibility by reusing significant portions of current antenna port indexing tables. Embodiments can also facilitate symmetric scheduling among multiple TRPs by providing options to schedule different numbers of layers on individual TRPs. This dynamic selection of TRPs and layers per TRP allows the network scheduler to follow changes in channel quality

TABLE 8

| Layers | CWs | Codeword-to-layer mapping, $i = 0, 1, \ldots, M_{symb}^{layer} - 1$ | |
| --- | --- | --- | --- |
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |
| 5 | 2 | $x^{(0)}(i) = d^{(0)}(2i)$  $x^{(2)}(i) = d^{(1)}(3i)$ $x^{(1)}(i) = d^{(0)}(2i + 1)$ $x^{(3)}(i) = d^{(1)}(3i + 1)$ $x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$  $x^{(3)}(i) = d^{(1)}(3i)$ $x^{(1)}(i) = d^{(0)}(3i + 1)$ $x^{(4)}(i) = d^{(1)}(3i + 1)$ $x^{(2)}(i) = d^{(0)}(3i + 2)$ $x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$  $x^{(3)}(i) = d^{(1)}(4i)$ $x^{(1)}(i) = d^{(0)}(3i + 1)$ $x^{(4)}(i) = d^{(1)}(4i + 1)$ $x^{(2)}(i) = d^{(0)}(3i + 2)$ $x^{(5)}(i) = d^{(1)}(4i + 2)$ $x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$  $x^{(4)}(i) = d^{(1)}(4i)$ $x^{(1)}(i) = d^{(0)}(4i + 1)$ $x^{(5)}(i) = d^{(1)}(4i + 1)$ $x^{(2)}(i) = d^{(0)}(4i + 2)$ $x^{(6)}(i) = d^{(1)}(4i + 2)$ $x^{(3)}(i) = d^{(0)}(4i + 3)$ $x^{(7)}(i) = d^{(1)}(4i + 3)$ | $M_{symb}^{layer} = M_{symb}^{(0)}/4 = M_{symb}^{(1)}/4$ |

The introduction of the extended TCI state (i.e., more than one pair of source RS) discussed above has created a need for multiple transmission hypotheses by a UE, such as single TRP transmission, dual TRP transmission, and even three when the UE moves around in the network, as well as changes in traffic load conditions on individual TRPs.

Various embodiments can provide various associations between TCI states with multiple source RS QCL pairs {qcl-Type1, qcl-Type2} and CDM groups. Put differently, a TCI state can be extended to have more than one pair of {qcl-Type1, qcl-Type2}, where each such pair is associated with a CDM group $\lambda$=0, 1, 2. In some embodiments, if DMRS type 1 is configured, then a TCI state may contain one or two source RS QCL pairs {qcl-Type1, qcl-Type2}, with the first pair being associated with CDM group $\lambda$=0 and the second pair of the TCI state being associated with CDM group $\lambda$=1. In this manner, a TCI state can indicate two different source RS for a given QCL type using a single TCI state ID, and thus can facilitate scheduling a PDSCH from two different sources (e.g., TRPs, antenna panels, etc.). As a further example, if DMRS type 2 is configured, then a TCI state may include three source RS QCL pairs {qcl-Type1, qcl-Type2}, each associated with a different CDM group $\lambda$=0, 1, or 2.

In other embodiments, rather than defining new multi-pair TCI states that are explicitly signaled to the UE, conventional Rel-15 RRC signalling that configures TCI states with only a single QCL source pair {qcl-Type1, qcl-Type2} can be reused and combined with rules to interpret extended multi-pair TCI states from combinations of the conventional single-pair TCI states. For example, TCI state #3 used to schedule two TRPs simultaneously can be the combination {TCI state #1, TCI state #2} where TCI states #1, 2 are single-pair stages used to schedule a single TRP.

Furthermore, each TCI state can be associated with a set of CDM groups regardless if it is a legacy TCI state or an extended TCI state. In one example the legacy TCI states #1, 2 can be associated with CDM groups $\lambda$=0, 1 respectively, whereas extended TCI state #3 is associated with both CDM groups $\lambda$=0, 1. These embodiments facilitate simple reconfiguration. For example, if TCI state #1 is reconfigured by changing the associated source RS (e.g., new serving cell/TRP), then all extended TCI states (e.g., TCI state #3) that include TCI state #1 are automatically changed as well, without the need to update an entire TCI state table.

Once a UE is configured with a TCI state table and an antenna port table according to various embodiments, DCI can be used to indicate, to the UE, a particular TCI state from the table with one, two or three source RS pairs for QCL. The DCI can also indicate a particular entry in the antenna port table that indicates a set of DMRS antenna ports that can be distributed across one, two or three CDM groups (also known as "DMRS port groups"). In one particular embodiment, if DCI indicates the same number of QCL source RS pairs and antenna port CDM groups, then the UE can apply one-to one mapping between QCL source RS pair and CDM group.

In other embodiments, if a scheduling DCI indicates more QCL source RS pairs (e.g., by extended TCI state) than the number of indicated CDM groups, then the UE can associate the first indicated QCL source RS pair with all indicated CDM groups (including a single indicated CDM group). In this manner, TCI states configured for multi-TRP transmission can be re-used also for single TRP-transmission (e.g., single CDM group), thereby making the TCI state table more efficient.

In other embodiments, if the scheduling DCI indicates fewer QCL source RS pairs than the number of indicated CDM groups, the UE can apply additional mapping rules. In case the DCI indicates a TCI state with a single QCL source RS pair, then the UE can associate that TCI state with all indicated antenna ports, regardless of how many CDM groups are associated with the particular entry in the antenna port table entry also indicated by DCI. This can be used, e.g., for dynamic fallback to legacy Rel-15 NR behavior. Alternately, in case the DCI indicates a particular TCI state with two QCL source RS pairs and three CDM groups, then the first source RS pair can be applied to antenna ports in the first CDM group, and the second source RS pair can be applied to antenna ports in the second and third CDM groups. Alternatively, if the UE is not configured to handle a different number of source RS pairs and CDM groups, it can ignore the scheduling DCI or respond with an error indication.

In some embodiments, the mapping between a QCL source pair {qcl-Type1, qcl-Type2} in a DCI-indicated TCI state and one of CDM groups $\lambda$=0, 1, 2 can be fixed according to a predefined rule, such that it does not depend on which CDM group is also indicated in the DCI. For example, if the UE is scheduled with CDM group $\lambda$=1 (as indicated by the antenna port indication table) and scheduling DCI indicates a TCI state comprising two QCL source pairs, the UE select only the second of the two QCL source pairs according to the predefined rule.

In other embodiments, the mapping between QCL source pairs {qcl-Type1, qcl-Type2} in a DCI-indicated TCI state and CDM groups $\Lambda$=0, 1, 2 is relative and depends on which CDM groups are also indicated in the DCI. For instance, the scheduled CDM group with the lowest index $\lambda$ can be mapped to the first QCL source pair comprising the DCI-indicated TCI state, the the second lowest index $\lambda$ is mapped to the second QCL source pair of the TCI state, etc.

As a further example, if the UE is DCI-scheduled with only CDM group $\lambda$=1 1 (as indicated by the antenna port indication table) and with a TCI state comprising two QCL source pairs, it can map the CDM group to the first QCL source pair since, although CDM group $\lambda$=1 is not the first CDM group, it is the first scheduled CDM group. In another example, the UE can be scheduled with CDM groups $\lambda$=0, 2 (which may require the additions of such DMRS port combinations in the DMRS port table) with DCI indicating a TCI state comprising three QCL source pairs. Since CDM groups $\lambda$=0, 2 are the first two scheduled CDM groups, they are respectively mapped to the first and second QCL source RS rather than the first and third QCL source RS pairs.

In other embodiments, legacy (e.g., Rel-15) NR antenna port tables can be extended to support CDM group symmetry in case an odd number of antenna ports are DCI-scheduled. Legacy tables for rank 3 use two ports for CDM group 0 and one port for CDM group 1 (e.g. port 1000-1002 for DMRS type 1) such that two of the three layers are always transmitted from TRP #0 and one layer from TRP #1. To efficiently support the symmetrical scheduling of such "odd numbered layer PDSCH", the symmetrical counterpart can be added to the antenna port table, i.e., ports 1001-1003 or 1000, 1002 and 1003. This facilitates better balancing of load among TRPs.

In an example of these embodiments, TRP symmetry can be provided by configuring two TCI states as follows. The first TCI state may contain a pair of source RS with the first source RS associated with TRP #0 and the second source RS associated with TRP #1. This TCI state can be used to indicate that ports 1000, 1001 of CDM group 0 are transmitted from TRP #0 and port 1002 of CDM group 1 is transmitted from TRP #1. The second TCI state may contain a source RS pair with the first source RS associated with TRP #1 and the second source RS associated with TRP #0. This second TCI state thus can be used to indicate that ports 1000, 1001 of CDM group 0 is transmitted from TRP #1, and that port 1002 of CDM group 1 is transmitted from TRP #0. By using TCI states in this manner, there is no need to update legacy antenna port indexing tables to also include symmetrical scheduling of such "odd numbered layer PDSCH".

In other embodiments, legacy (e.g., Rel-15) NR antenna port tables can be extended to break CDM group symmetry in case an even number of antenna ports are DCI-scheduled. Legacy Rel. 15 antenna port indication tables for rank 4 use two ports for CDM group 0 and two port for CDM group 1 (e.g. port 1000-1003 for DMRS type 1) such that two layers are transmitted from TRP #0 and two layers from TRP #1. As such, asymmetrical scheduling is not possible (e.g., three layers from one TRP, one layer from the other TRP). To efficiently support the asymmetrical scheduling of an even number of layers, the asymmetrical counterparts can be added to the antenna port table, e.g. ports {1000, 1001, 1002 and 1004} and ports {1000, 1002, 1003, 1006} in the table for DMRS type 1 with two DMRS symbols. This enhancement facilitates (3,1) and (1,3) layer scheduling from the first TRP (first source QCL pair) and the second TRP (second source QCL pair) in indicated TCI state, respectively.

For DMRS type 2, legacy (e.g., Rel-15) NR antenna port tables include port mapping to CDM groups options of (1, 0, 0); (0, 1, 0); (0, 0, 1); (2, 0, 0); (0, 2, 0); (0, 0, 2); (1, 1, 0); (2, 1, 0); (0, 1, 2); (2, 2, 0); (2, 2, 1); and (2, 2, 2), where (L1, L2, L3) are the number of layers from the first, second, and third TRPs (first, second, and third source RS QCL pairs), respectively. In other embodiments, particularly applicable to DMRS type 2, these legacy antenna port tables can be extended to include the additional option of (1, 1, 1) (e.g., antenna ports 1000, 1002 and 1004) to facilitate scheduling from three TRPs with different CDM groups.

In other embodiments, the legacy (e.g., Rel-15) NR antenna port tables can also be enhanced to include one or more of (1, 1, 0), (1, 0, 1), and (0, 1, 1) for three CDM groups without data. These can correspond, for example, to ports {1000, 1002}, {1000, 1004}, and {1002, 1004}, respectively. These table entries can facilitate support for multi-user (MU) MIMO with DMRS type 2, where one UE is scheduled rank 2 while a second UE is scheduled rank 1 using the CDM group not used by the first UE. Hence, the antenna port indication table must indicate three CDM groups without data for this case. This is also useful for the case of multi-PDSCH scheduling to the same UE, where the first PDSCH has two layers using two CDM groups and the second PDSCH use the third CDM group.

In other embodiments, instead of extending existing antenna port tables, additional antenna port tables can be defined and/or specified, with the particular choice of table (e.g., which of the original or additional tables) to use being implicitly indicated by (or inferred from) the number of QCL source RS pairs in the TCI state indicated by DCI. This facilitates simpler arrangement of antenna port tables tailored to multi-TPR transmission. For example, an antenna port table value with only one CDM group without data may not be relevant for two-TRP transmission. Hence, an additional two TRP antenna port table could be constructed for this case, whereby the irrelevant entries are replaced with more relevant ones for this case. Similarly, a three-TRP antenna port table can be constructed (e.g., for DMRS Type 2) with no entries for 1-2 CDM groups without data. In this manner, each table can be optimized for either one, two, and three-TRP transmission, with the number of source RS QCL pairs in the indicated TCI state is used to select which table to use. This arrangement can potentially reduce signaling overhead since one table (e.g., with many values) does not need to fit all cases of single- and multi-TRP transmission and reception.

In other embodiments, some restrictions can be configured and/or selected by the network, such that the multiple pairs in the extended TCI state must have the same source RS for QCL Type D, thereby facilitating the UE to receive these multiple transmissions using the same RX beam. The introduction of such restrictions can be based on UE capabilities, such as provided by the UE to the network (e.g., via RRC signaling). For example, group-based beam reporting is used in NR, such that the UE can report a group of two beams (i.e., two source RSs for QCL type D) only if the UE can receive these two simultaneously. This typically requires the UE to have two antenna panels for reception. Hence, the network can configure two different source RS IDs in two different pairs of an extended TCI state only if the UE has reported these source RS in a group-based beam reporting. From the UE's perspective, it does not expect to receive DCI with a TCI state having two different source RSs for QCL type D unless it has reported these in a group-based beam report.

In some embodiments, in addition an extended TCI state including one or more pairs of source RS QCL relations with each pair associated with a CDM group a DCI can also include a time offset between the reception of the DCI and reception of the corresponding PDSCH. In such case, the UE can apply various exemplary rules and/or thresholds to determine QCL relations between the source RS and target RS for the PDCCH(s).

For example, if the time offset is greater than or equal to Threshold-Sched-Offset reported by the UE to the network as part of its capability, the UE can determine that the PDSCH DMRS antenna port(s) belonging to CDM group are QCL with the source RSs of the TCI state that is activated for PDCCH reception.

As another example, if the time offset is less than Threshold-Sched-Offset reported by the UE to the network as part of its capability, and if any of the activated extended TCI states contains 'QCL-TypeD' in any of their source RS QCL pairs, the UE can determine that the PDSCH DMRS antenna port(s) belonging to any of the indicated CDM groups is QCL with the source RSs of the TCI state that is activated for PDCCH reception.

As a further example, if the time offset is less than Threshold-Sched-Offset reported by the UE to the network as part of its capability, and if the any of the activated extended TCI states contains 'QCL-TypeD' in any of its source RS QCL pairs, the UE can determine that the PDSCH DMRS antenna port(s) belonging to any of the indicated CDM groups is QCL with the source RSs of the TCI state that is activated for PDCCH reception.

As yet another example, if none of the configured extended TCI states contains 'QCL-TypeD', regardless of the time offset relative to Threshold-Sched-Offset, the UE can determine that the PDSCH DMRS antenna port(s) belonging to CDM group are QCL with the source RSs defined in the associated pair {qcl-Type1, qcl-Type2}.

As a further example, if none of the configured extended TCI states that are activated for PDSCH contains 'QCL-TypeD', regardless of the time offset relative to Threshold-Sched-Offset, the UE can determine that the PDSCH DMRS antenna port(s) belonging to CDM group are QCL with the source RSs defined in the associated pair {qcl-Type1, qcl-Type2}.

In some other embodiments, if the UE receives a DCI indicating an extended TCI state including one or more {qcl-Type1, qcl-Type2}, and if the extended TCI state includes 'QCL-Type D', then the UE can determine that the time offset between the reception of the DL DCI and the corresponding PDSCH is larger than Threshold-Sched-Offset.

In other embodiments, there can be constraints on, and/or dependencies between, the number of activated TCI states corresponding to single-TRP transmission and the number of activated TCI states corresponding to multi-TRP transmission. For example, a combination of no more than X1 active TCI states corresponding to single-TRP transmission and no more than X2 active TCI states corresponding to multi-TRP transmission can be supported for a single UE. As another example, activation of a TCI state corresponding to single-TRP transmission can implicitly activate one or more TCI states corresponding to multi-TRP transmission, or vice versa. Alternately, there can be a constraint on the total number of source RS for QCL contained in all the active TCI states, whether corresponding to single-TRP or multi-TRP transmission.

As discussed above, when the total number of layers transmitted by multiple TRPs is more than four, the layers must be mapped to two CWs. In such situations, it is desirable to map all layers transmitted by one TRP to the same CW such that all DMRS ports associated with a CW are within the same CDM group. For example, if TRP1 transmits two layers and TRP2 transmits three layers, it is desirable to map the two layers of TRP1 to layers 0-1 and the three layers of TRP2 to layers 2-4, resulting in CW1 being mapped to TRP1 and CW2 to TRP2.

To support such features, in some embodiments, new entries can be provided in antenna port tables. For example, new entries are needed in the DMRS antenna port Tables 5-7 (above) in the columns for two-CW scenarios (e.g., "Codeword 0 enabled, Codeword 1 enabled"). As a more specific example, entry (0, 1, 2, 3, 6) can be added to the DMRS port(s) column in Table 6 for type-1 DMRS with two front loaded symbols so that ports 0, 1 of CDM group 0 are allocated to CW0 and ports 2, 3, 6 of CDM group 1 are allocated to CW1. Other exemplary new entries in such tables can include (0, 1, 4, 2, 3, 6) for (L1, L2)=(3,3); (0, 1, 4, 2, 3, 6, 7) for (L1, L2)=(3,4); and (0, 1, 4, 5, 2, 3, 6, 7) for (L1, L2)=(4,4). Note that the mapping between DMRS ports and CDM groups for this example is shown in Table 2 above.

As another specific example, for type-2 DMRS with two front-loaded symbols, the following new entries can be added to Table 7: (0, 1, 2, 3, 8) for (L1, L2)=(2,3); (0, 1, 6, 2, 3, 8) for (L1, L2)=(3,3); (0, 1, 6, 2, 3, 8, 9) for (L1, L2)=(3,4); and (0, 1, 6, 7, 2, 3, 8, 9) for (L1, L2)=(4,4). Note that the mapping between DMRS ports and CDM groups for this example is shown in Table 3 above.

Figure 9:
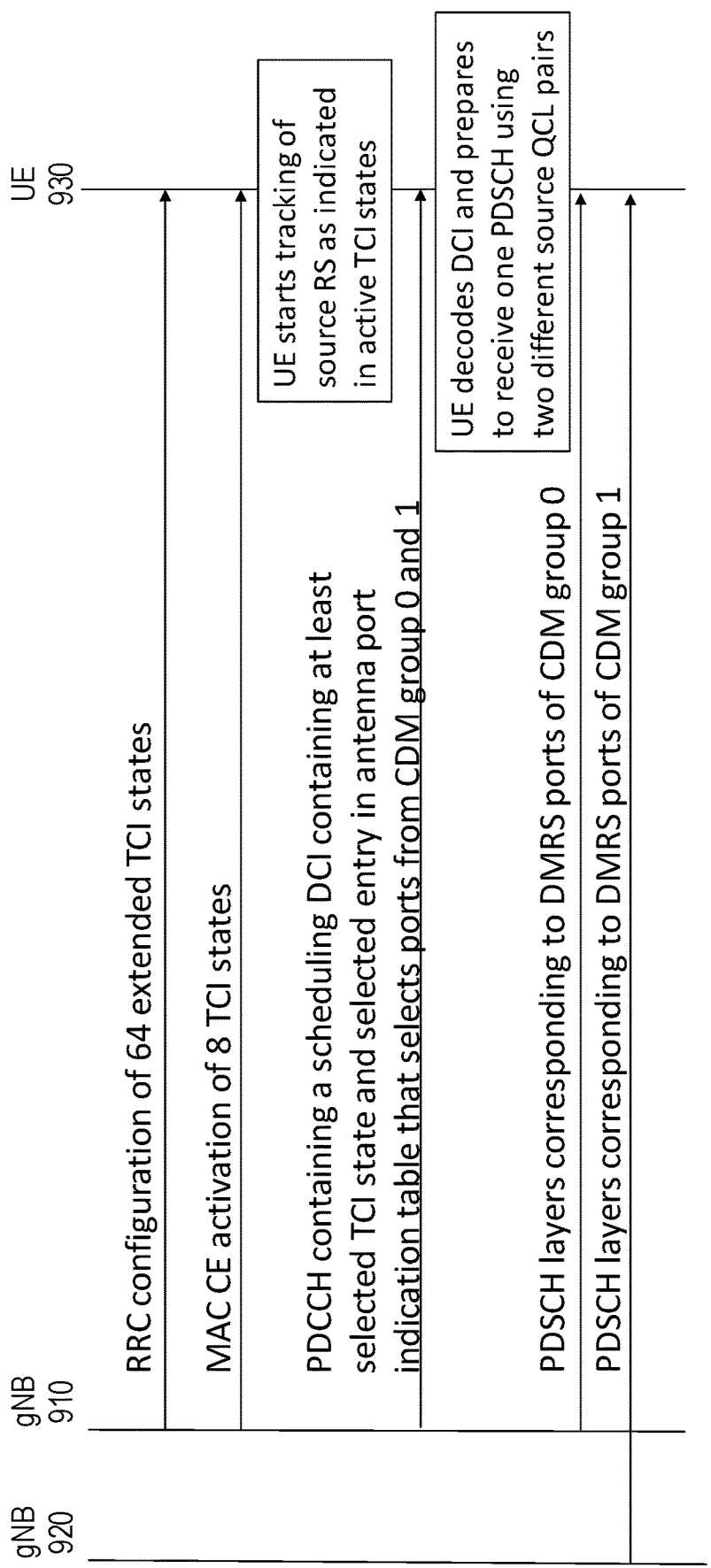
FIGS. 9-10 show flow diagrams for exemplary operational scenarios in which a UE communicates with two gNBs that can provide PDSCH diversity transmission, according to various exemplary embodiments of the present disclosure.

FIG. 9 shows an exemplary operational scenario in which a UE 930 communicates with two gNBs 910, 920 that can provide PDSCH diversity (e.g., multi-TRP) transmission, according to various exemplary embodiments of the present disclosure. Initially, the UE can be configured by gNB 910 (e.g., via RRC) with 64 extended TCI states, such as those discussed above. Subsequently, the UE can be configured by gNB 910 (e.g., by MAC CE activation) to actively track multiple (e.g., eight) TCI states of the configured TCI states. The UE begins to track these multiple activated TCI states by performing measurements on the associated source RS(s) for each activated TCI state. Note that the RS associated with a TCI state is transmitted from the same gNB as the PDSCH associated with the same TCI state.

The UE then receives a scheduling DCI (e.g., via PDCCH) that indicates a particular activated TCI state and selects antenna ports in two CDM groups (e.g., $\lambda$=0, 1). Based on the information decoded from this DCI, the UE then receives the PDSCH where some layers are transmitted from gNB 910 (e.g., $\lambda$=0). and the rest from gNB 920 (e.g., $\lambda$=1). The UE uses the indicated source RS QCL relations to aid the channel estimation and reception of the DMRS and PDSCH layers from each of the two gNBs (e.g., TRPs). The source RSs can for example be used to estimate the delay spread, Doppler spread, and Doppler shift induced by the respective wireless channels.

Figure 10:
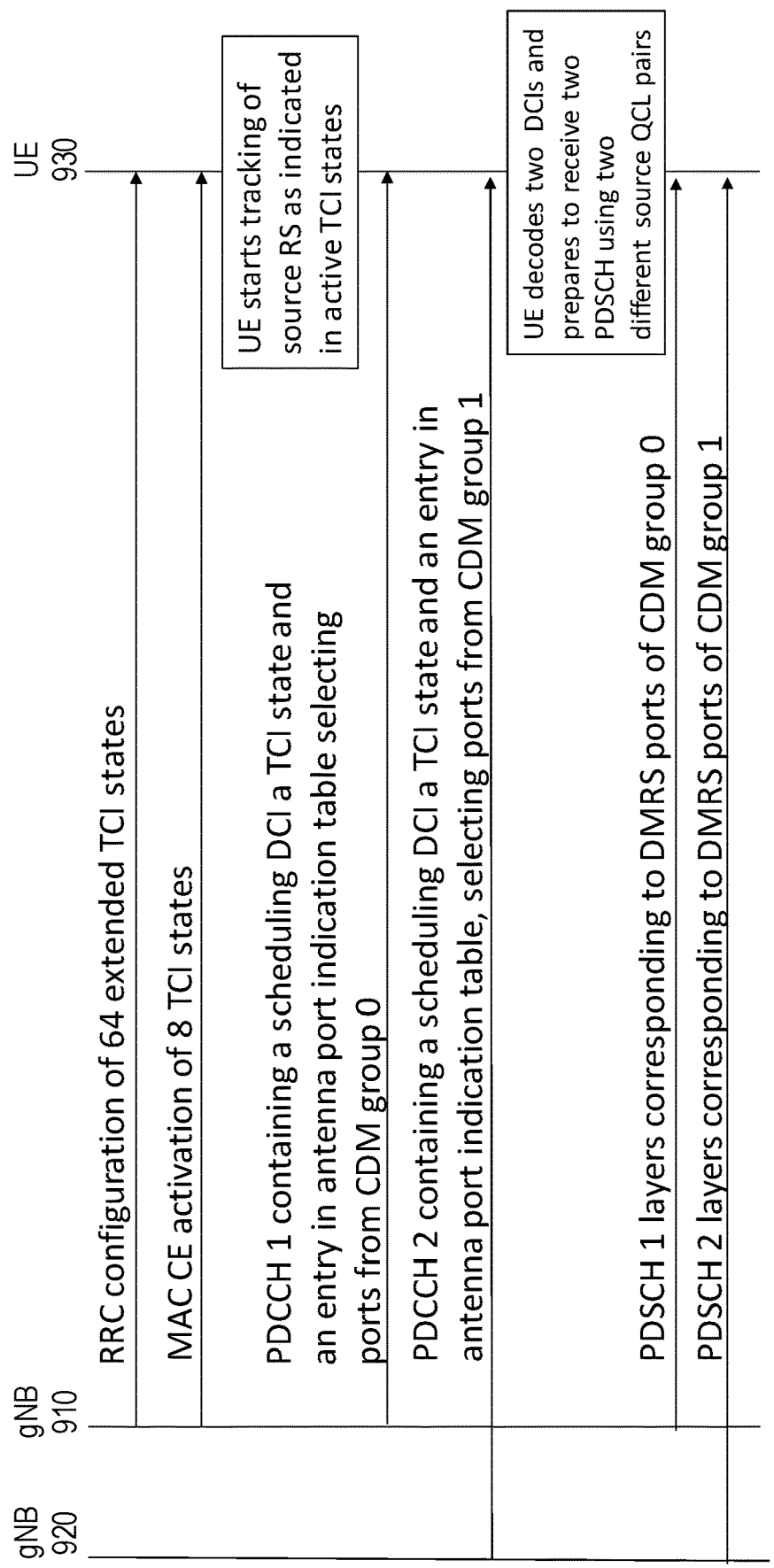

FIG. 10 shows another exemplary operational scenario in which a UE 930 communicates with two gNBs 910, 920 that can provide PDSCH diversity (e.g., multi-TRP) transmission, according to other exemplary embodiments of the present disclosure. In this scenario, the UE receives PDCCH and PDSCH from both gNBs. For example, the UE can receive from gNB 910 a scheduling DCI (e.g., via PDCCH1) that indicates a particular activated TCI state and selects antenna ports in one CDM group (e.g., $\lambda$=0, 1). The UE can also receive from gNB 920 a scheduling DCI (e.g., via PDCCH2) that indicates a different activated TCI state and selects antenna ports in a different CDM group (e.g., $\lambda$=0, 1). For example, PDCCH1 and PDCCH2 can indicate antenna ports corresponding to CDM groups 0 and 1, respectively.

Based on the information decoded from these DCIs, the UE then receives the PDSCH where some layers are transmitted from gNB1 (e.g., $\lambda$=0). and the rest from gNB2 (e.g., $\lambda$=1). The UE uses the indicated source RS QCL relations to aid the channel estimation and reception of the DMRS and PDSCH layers from each of the two gNBs (e.g., TRPs). The source RSs can for example be used to estimate the delay spread, Doppler spread, and Doppler shift induced by the respective wireless channels.

Although the above description focuses on PDSCH, the described principles can also be applied to PUSCH together with certain appropriate modifications, as indicated by references to PUSCH in the above description. For example, there are no PUSCH TCI states defined in Rel-15, although such a feature could be introduced in the future. Alternatively, the SRS resource indication (SRI) can fulfil the same role as the TCI state does for PDSCH.

These embodiments described above can be further illustrated with reference to FIGS. 11-13, which depict exemplary methods performed by UEs and network nodes. In other words, various features of the operations described below, with reference to FIGS. 11-13, correspond to various embodiments described above.

Figure 11:
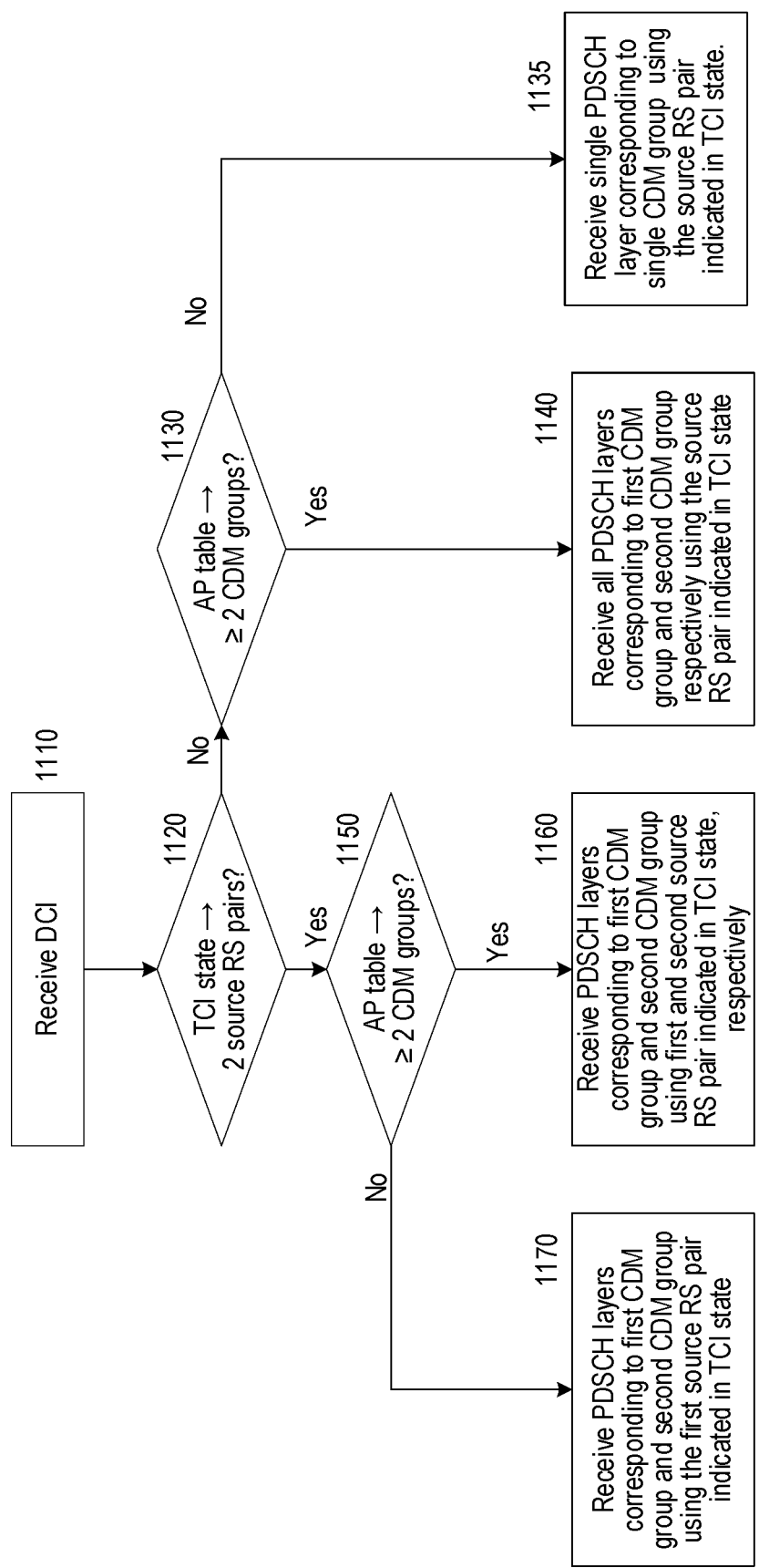
FIGS. 11-12 show flow diagrams of exemplary methods (e.g., procedures) performed by a user equipment (UE, e.g., wireless device, IoT device, etc.), according to various exemplary embodiments of the present disclosure.

In particular, FIG. 11 shows a flow diagram of an exemplary method (e.g., procedure) for receiving a plurality of PDSCH layers when DCI indicates a different number of source RS pairs and CDM groups, according to various exemplary embodiments of the present disclosure. The exemplary method can be performed by a user equipment (UE, e.g., wireless device, IoT device, modem, etc. or component thereof) in communication with one or more network nodes (e.g., base stations, gNBs, en-gNBs, etc., or components thereof) in a radio access network (RAN, e.g., NG-RAN). For example, the exemplary method shown in FIG. 11 can be implemented in a UE configured as described herein with reference to other figures herein. Furthermore, the exemplary method shown in FIG. 11 can be used cooperatively with other exemplary methods described herein (e.g., FIGS. 12-13) to provide various exemplary benefits and/or advantages described herein. Although FIG. 11 shows blocks in a particular order, the operations of the exemplary method can be performed in a different order than shown and can be combined and/or divided into blocks having different functionality than shown. Optional blocks or operations are indicated by dashed lines.

The exemplary method shown in FIG. 11 can include the operations of block 1110, where the UE can receive, from the network, a scheduling DCI that indicates a particular activated TCI state to be used for receiving a subsequent PDSCH. This indicated TCI state can include a first number of source RS QCL pairs, where the first number can be one or more. The DCI can also indicate a second number of CDM groups, such as by providing an index to an antenna port table entry that is associated with the second number of CDM groups. The second number can be different than the first number.

The exemplary method can also include the operations of block 1120, where the UE can determine whether the indicated TCI state includes at least two source RS QCL pairs. If the result of this determination is negative, operation proceeds to block 1130, where the UE can determine if the antenna port table entry is associated with at least two CDM groups. If the result of the determination in block 1130 is negative, operation proceeds to block 1135 where the UE can receive a single PDSCH layer corresponding to the single CDM group using the source RS pair associated with the TCI state. If the result of the determination in block 1130 is positive, operation proceeds to block 1140 where the UE can receive all PDSCH layers corresponding to first CDM group and second CDM group respectively using the single source RS pair associated with the indicated TCI state.

On the other hand, if the result of the determination in block 1120 is positive, operation proceeds to block 1150 where the UE can also determine if the antenna port table entry is associated with at least two CDM groups. If the result of the determination in block 1150 is negative, operation proceeds to block 1170 where the UE can receive all PDSCH layers corresponding to first CDM and second CDM groups using the first source RS pair associated with the indicated TCI state. If the result of the determination in block 1150 is positive, operation proceeds to block 1160 where the UE can receive PDSCH layers corresponding to the first CDM group using the first source RS pair associated with the indicated TCI state, and receive PDSCH layers corresponding to the second CDM group using the second source RS pair associated with the indicated TCI state.

Figure 12:
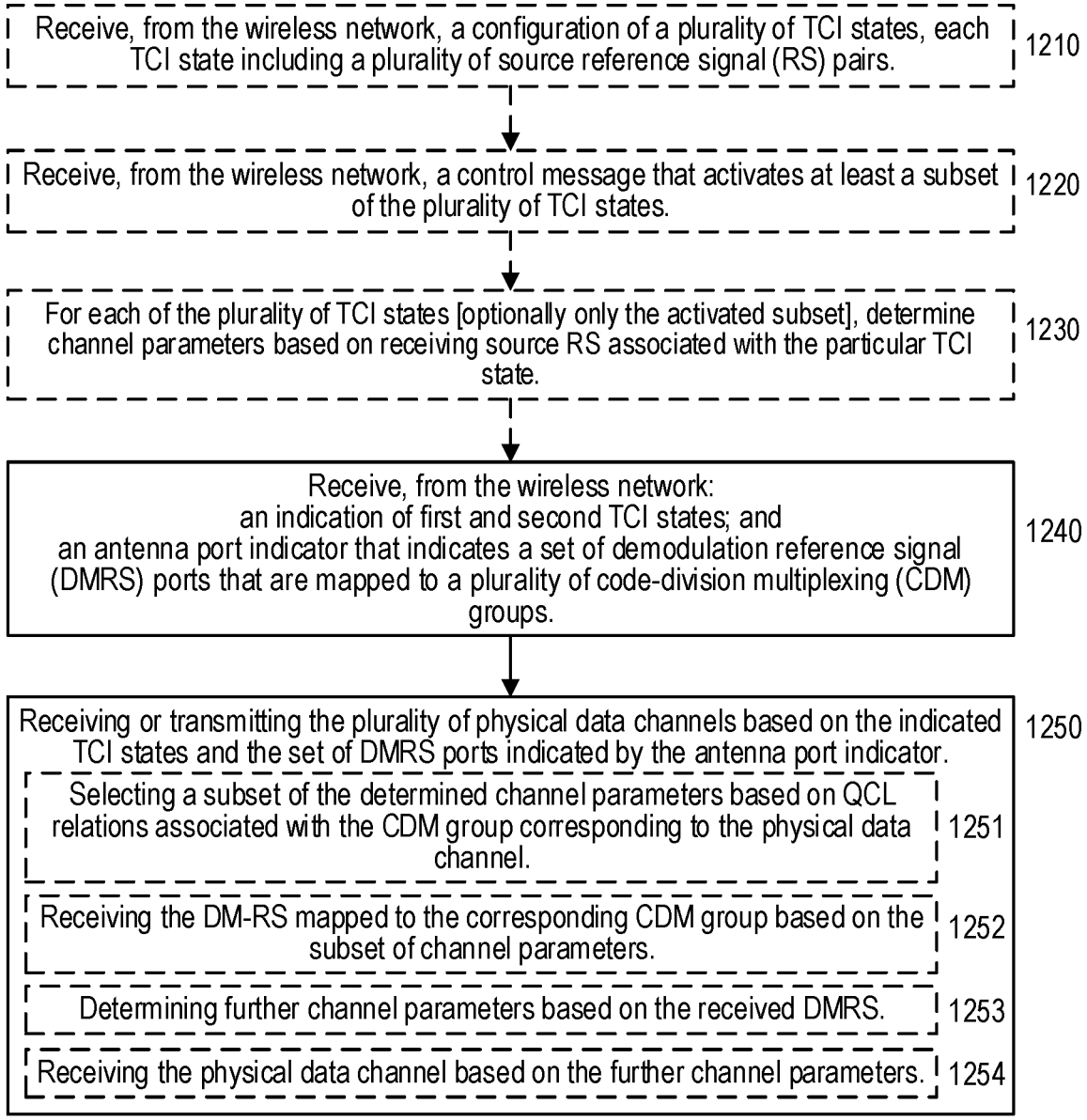

In addition, FIG. 12 shows a flow diagram of an exemplary method (e.g., procedure) for transmitting or receiving a plurality of physical data channels in a wireless network, according to various exemplary embodiments of the present disclosure. The exemplary method can be performed by a user equipment (UE, e.g., wireless device, IoT device, modem, etc. or component thereof) in communication with one or more network nodes (e.g., base stations, gNBs, en-gNBs, TRPs, etc., or components thereof) in the wireless network (e.g., NG-RAN). For example, the exemplary method shown in FIG. 12 can be implemented in a UE configured as described herein with reference to other figures. Furthermore, the exemplary method shown in FIG. 12 can be used cooperatively with other exemplary methods described herein (e.g., FIGS. 11, 13) to provide various exemplary benefits and/or advantages described herein. Although FIG. 12 shows specific blocks in a particular order, the operations of the exemplary method can be performed in a different order than shown and can be combined and/or divided into blocks having different functionality than shown. Optional blocks or operations are indicated by dashed lines.

In some embodiments, the exemplary method shown in FIG. 12 can include the operations of blocks 1210 and 1230.

In block 1210, the UE can receive, from the wireless network, an indication of a plurality of Transmission Configuration Indicator (TCI) states, with each state including a plurality of source RS pairs. For example, the UE can receive a configuration (e.g., via RRC) of 64 configured TCI states, each with two or more source RS pairs. In block 1230, the UE can, for each of the plurality of TCI states, determine channel parameters based on receiving the source RS associated with the particular TCI state.

In some embodiments, the exemplary method can also include the operations of block 1220, where the UE can receive a control message (e.g., via MAC CE) that activates at least a subset of the plurality of states that were indicated and/or configured in operation 1210 (e.g., eight activated TCI states). In such embodiments, the UE can determine the channel parameters (e.g., in block 1230) only for the activated subset of TCI states.

In some embodiments, the exemplary method can also include the operations of block 1240, where the UE can receive, from the wireless network, an indication of a plurality of antenna ports for demodulation reference signals (DM-RS), where each antenna port is mapped to a CDM group associated with one of the physical data channels.

The exemplary method can also include the operations of block 1250, where the UE can receive, from the wireless network, an indication of a TCI state that includes one or more source RS pairs, with each source RS pair having a corresponding pair of quasi-colocation (QCL) relations with antenna ports, for DM-RS, that are mapped to a plurality of code-division multiplexing (CDM) groups. In some embodiments, the indicated TCI can be one of the plurality of TCI states configured in the operations of block 1210. In some embodiments, each corresponding QCL relation can be based on one or more of the following: Doppler shift, Doppler spread, average delay, delay spread, and spatial reception.

In some embodiments, the DM-RS can be Type-1, and the indicated TCI state can include no more than two source RS pairs. In other embodiments, the DM-RS can be Type-2, and the indicated TCI state can include no more than three source RS pairs.

In some embodiments, the indicated TCI state includes a single source RS pair, and the single source RS pair has a corresponding pair of QCL relations with all of the plurality of antenna ports.

In some embodiments, the indicated TCI state includes a first source RS pair having a corresponding first pair of QCL relations with all antenna ports associated with a first CDM group, and a second source RS pair having a corresponding second pair of QCL relations with all antenna ports associated with a second CDM group. In such embodiments, the number of antenna ports associated with the first CDM group can be different than the number of antenna ports associated with the second CDM group.

In some of these embodiments, the first and second CDM groups can be associated with respective first and second indices, where the first index is less than the second index. In such embodiments, the exemplary method can also include the operations of block 1260, where the UE can receive, from the wireless network, scheduling information for the physical data channels, where the scheduling information includes the first and second indices associated with the respective first and second CDM groups.

In other of these embodiments, the indicated TCI state can also include a third source RS pair having a corresponding third pair of QCL relations with all antenna ports associated with a third CDM group. In such case, the first, second, and third CDM groups can be associated with respective first, second, and third sources in the wireless network.

In other of these embodiments, the indicated TCI state can identify a first TCI state including the first source RS pair and a second TCI state including the second source RS pair.

In yet other embodiments, the indicated TCI state can be one of a symmetric pair of TCI states, with each TCI state of the symmetric pair including first and second source RS pairs. Moreover, each TCI state of the symmetric pair can have different QCL relations between the first and second source RS pairs and antenna ports that are mapped to first and second CDM groups.

In yet other embodiments, the indicated TCI state can include first and second source RS pairs. The first source RS pair can have a corresponding pair of QCL relations with the antenna ports mapped to a first CDM group, and the second source RS pair can have a corresponding pair of QCL relations with antenna ports mapped to second and third CDM groups.

The exemplary method can also include the operations of block 1270, where the UE can receive or transmit the plurality of physical data channels based on the QCL relations for the one or more source RS pairs of the indicated TCI state. In some embodiments, the plurality of physical data channels can carry different redundancy versions (RVs) of a single data block. In some embodiments, the plurality of physical data channels can be respective layers of a physical downlink shared channel (PDSCH) or a physical uplink shared channel (PUSCH). In other embodiments, each physical data channel can be a subset of all layers of a PDSCH or a PUSCH.

In some embodiments that include the determining operations of block 1230, the operations of block 1270 can include the operations of sub-blocks 1271-1274, for each of the physical data channels. In sub-block 1271, the UE can select a subset of the determined channel parameters based on the QCL relations associated with the CDM group corresponding to the particular physical data channel. In sub-block 1272, the UE can receive the DM-RS mapped to the corresponding CDM group based on the subset of channel parameters. In this manner, the UE can utilize the source RS pairs and the QCL relations to receive a target RS, e.g., DM-RS. In sub-block 1273, the UE can determine further channel parameters based on the received DM-RS. In sub-block 1274, the UE can receive the physical data channel based on the further channel parameters.

Figure 13:
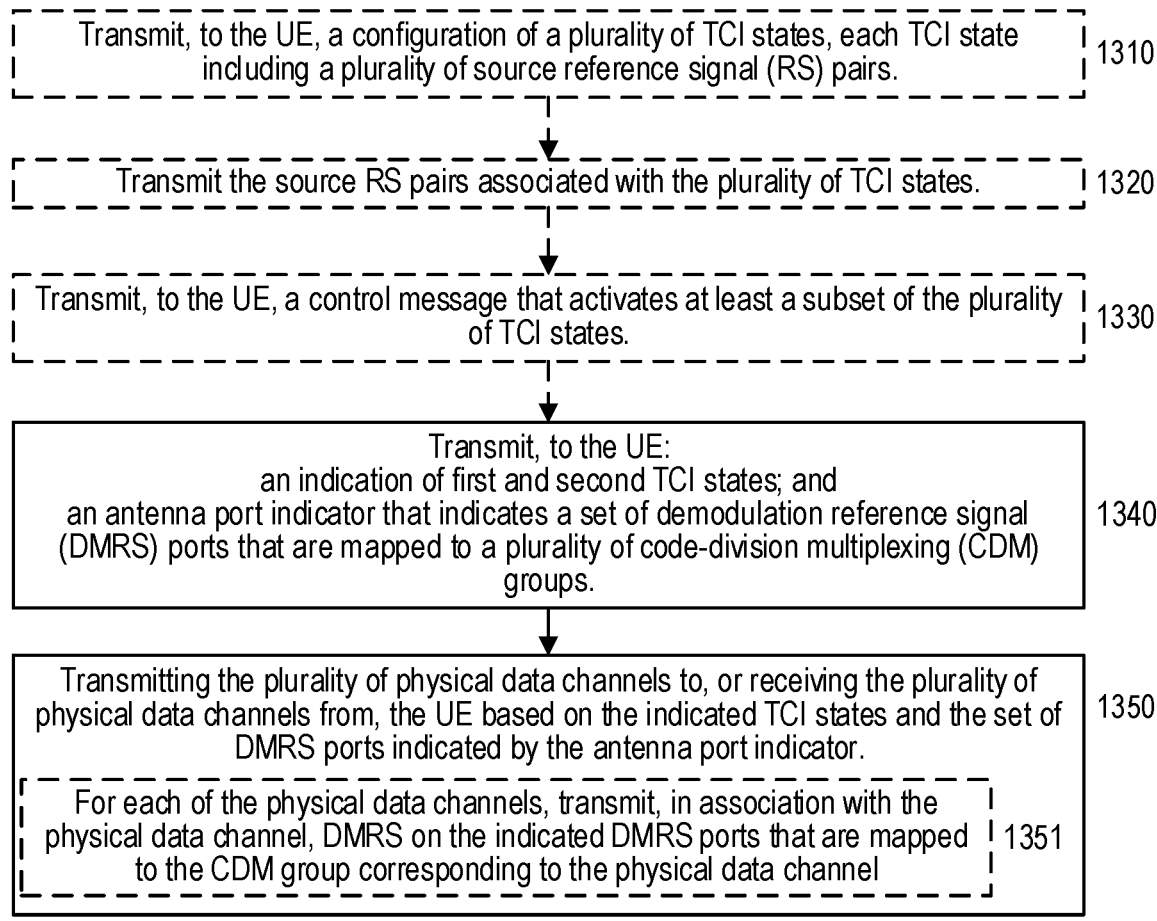
FIG. 13 shows a flow diagram of an exemplary method (e.g., procedure) performed by a wireless network (e.g., NG-RAN) comprising one or more nodes (e.g., base stations, gNBs, eNBs, en-gNBs, TRPs, etc. or components thereof), according to various exemplary embodiments of the present disclosure.

In addition, FIG. 13 shows an exemplary method (e.g., procedure) for transmitting or receiving a plurality of physical data channels with a single user equipment (UE), according to various exemplary embodiments of the present disclosure. The exemplary method can be performed by a wireless network (e.g., NG-RAN) comprising one or more nodes (e.g., base stations, gNBs, en-gNBs, TRPs, etc., or components thereof) that are in communication with the UE (e.g., wireless device, IoT device, modem, etc. or component thereof). For example, the exemplary method shown in FIG. 13 can be implemented in one or more network nodes configured in various ways described herein, such as with reference to other figures. Furthermore, the exemplary method shown in FIG. 13 can be used cooperatively with other exemplary methods described herein (e.g., FIGS. 11-12) to provide various exemplary benefits and/or advantages. Although FIG. 13 shows specific blocks in a particular order, the operations of the exemplary method can be performed in different orders than shown and can be combined and/or divided into blocks with different functionality than shown. Optional blocks or operations are indicated by dashed lines.

In some embodiments, the exemplary method shown in FIG. 13 can include the operations of blocks 1310, where the wireless network can transmit, to the UE, an indication of a plurality of Transmission Configuration Indicator (TCI) states, with each state including a plurality of source RS pairs. For example, the wireless network can provide the UE with a configuration (e.g., via RRC) of 64 configured TCI states, each with two or more source RS pairs. In some embodiments, the exemplary method can also include the operations of block 1320, where wireless network can transmit, to the UE, a control message (e.g., via MAC CE) that activates at least a subset of the plurality of states that were indicated and/or configured in operation 1310 (e.g., eight activated TCI states).

In some embodiments, the exemplary method can also include the operations of block 1330, where the wireless network can transmit, to the UE, an indication of a plurality of antenna ports for demodulation reference signals (DM-RS), where each antenna port is mapped to a CDM group associated with one of the physical data channels.

The exemplary method can also include the operations of block 1340, where the wireless network can transmit, to the UE, an indication of a TCI state that includes one or more source RS pairs, with each source RS pair having a corresponding pair of quasi-colocation (QCL) relations with antenna ports, for DM-RS, that are mapped to a plurality of code-division multiplexing (CDM) groups. In some embodiments, the indicated TCI can be one of the plurality of TCI states configured in the operations of block 1310. In some embodiments, each corresponding QCL relation can be based on one or more of the following: Doppler shift, Doppler spread, average delay, delay spread, and spatial reception.

In some embodiments, the DM-RS can be Type-1, and the indicated TCI state can include no more than two source RS pairs. In other embodiments, the DM-RS can be Type-2, and the indicated TCI state can include no more than three source RS pairs.

In some embodiments, the indicated TCI state includes a single source RS pair, and the single source RS pair has a corresponding pair of QCL relations with all of the plurality of antenna ports.

In some embodiments, the indicated TCI state includes a first source RS pair having a corresponding first pair of QCL relations with all antenna ports associated with a first CDM group, and a second source RS pair having a corresponding second pair of QCL relations with all antenna ports associated with a second CDM group. In such embodiments, the number of antenna ports associated with the first CDM group can be different than the number of antenna ports associated with the second CDM group.

In some of these embodiments, the first and second CDM groups can be associated with respective first and second indices, where the first index is less than the second index. In such embodiments, the exemplary method can also include the operations of block 1350, where the wireless network can transmit, to the UE, scheduling information for the physical data channels, where the scheduling information includes the first and second indices associated with the respective first and second CDM groups.

In other of these embodiments, the indicated TCI state can also include a third source RS pair having a corresponding third pair of QCL relations with all antenna ports associated with a third CDM group. In such case, the first, second, and third CDM groups can be associated with respective first, second, and third sources in the wireless network.

In other of these embodiments, the indicated TCI state can identify a first TCI state including the first source RS pair and a second TCI state including the second source RS pair.

In yet other embodiments, the indicated TCI state can be one of a symmetric pair of TCI states, with each TCI state of the symmetric pair including first and second source RS pairs. Moreover, each TCI state of the symmetric pair can have different QCL relations between the first and second source RS pairs and antenna ports that are mapped to first and second CDM groups.

In yet other embodiments, the indicated TCI state can include first and second source RS pairs. The first source RS pair can have a corresponding pair of QCL relations with the antenna ports mapped to a first CDM group, and the second source RS pair can have a corresponding pair of QCL relations with antenna ports mapped to second and third CDM groups.

The exemplary method can also include the operations of block 1360, where the wireless network can transmit the plurality of physical data channels to, or receive the plurality of physical data channels from, the UE based on the QCL relations for the one or more source RS pairs of the indicated TCI state. In some embodiments, the plurality of physical data channels can carry different redundancy versions (RVs) of a single data block. In some embodiments, the plurality of physical data channels can be respective layers of a physical downlink shared channel (PDSCH) or a physical uplink shared channel (PUSCH). In other embodiments, each physical data channel can be a subset of all layers of a PDSCH or a PUSCH.

Note that operations of blocks 1310-1360 of FIG. 13 are complementary to operations in respective blocks 1210-1220 and 1240-1270 of FIG. 12.

Although various embodiments are described above in terms of methods, techniques, and/or procedures, the person of ordinary skill will readily comprehend that such methods, techniques, and/or procedures can be embodied by various combinations of hardware and software in various systems, communication devices, computing devices, control devices, apparatuses, non-transitory computer-readable media, computer program products, etc.

Figure 14:
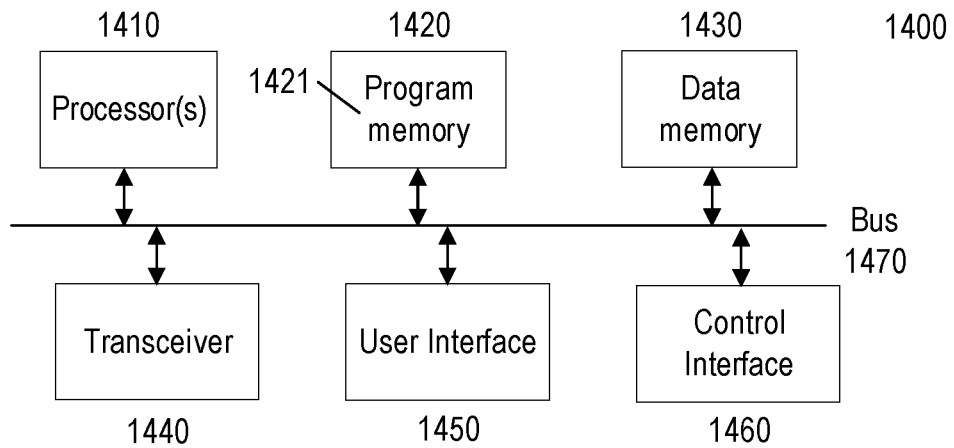
FIG. 14 is a block diagram of an exemplary wireless device or UE according to various exemplary embodiments of the present disclosure.

FIG. 14 shows a block diagram of an exemplary wireless device or user equipment (UE) 1400 (hereinafter referred to as "UE 1400") according to various embodiments of the present disclosure, including those described above with reference to other figures. For example, UE 1400 can be configured by execution of instructions, stored on a computer-readable medium, to perform operations corresponding to one or more of the exemplary methods described herein.

UE 1400 can include a processor 1410 (also referred to as "processing circuitry") that can be operably connected to a program memory 1420 and/or a data memory 1430 via a bus 1470 that can comprise parallel address and data buses, serial ports, or other methods and/or structures known to those of ordinary skill in the art. Program memory 1420 can store software code, programs, and/or instructions (collectively shown as computer program product 1421 in FIG. 14) that, when executed by processor 1410, can configure and/or facilitate UE 1400 to perform various operations, including operations corresponding to various exemplary methods described herein. As part of or in addition to such operations, execution of such instructions can configure and/or facilitate UE 1400 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1440, user interface 1450, and/or control interface 1460.

As another example, processor 1410 can execute program code stored in program memory 1420 that corresponds to MAC, RLC, PDCP, and RRC layer protocols standardized by 3GPP (e.g., for NR and/or LTE). As a further example, processor 1410 can execute program code stored in program memory 1420 that, together with radio transceiver 1440, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1410 can execute program code stored in program memory 1420 that, together with radio transceiver 1440, implements device-to-device (D2D) communications with other compatible devices and/or UEs.

Program memory 1420 can also include software code executed by processor 1410 to control the functions of UE 1400, including configuring and controlling various components such as radio transceiver 1440, user interface 1450, and/or control interface 1460. Program memory 1420 can also comprise one or more application programs and/or modules comprising computer-executable instructions embodying any of the exemplary methods described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1420 can comprise an external storage arrangement (not shown) remote from UE 1400, from which the instructions can be downloaded into program memory 1420 located within or removably coupled to UE 1400, so as to enable execution of such instructions.

Data memory 1430 can include memory area for processor 1410 to store variables used in protocols, configuration, control, and other functions of UE 1400, including operations corresponding to, or comprising, any of the exemplary methods described herein. Moreover, program memory 1420 and/or data memory 1430 can include non-volatile memory (e.g., flash memory), volatile memory (e.g., static or dynamic RAM), or a combination thereof. Furthermore, data memory 1430 can comprise a memory slot by which removable memory cards in one or more formats (e.g., SD Card, Memory Stick, Compact Flash, etc.) can be inserted and removed.

Persons of ordinary skill will recognize that processor 1410 can include multiple individual processors (including, e.g., multi-core processors), each of which implements a portion of the functionality described above. In such cases, multiple individual processors can be commonly connected to program memory 1420 and data memory 1430 or individually connected to multiple individual program memories and or data memories. More generally, persons of ordinary skill in the art will recognize that various protocols and other functions of UE 1400 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1440 can include radio-frequency transmitter and/or receiver functionality that facilitates the UE 1400 to communicate with other equipment supporting like wireless communication standards and/or protocols. In some exemplary embodiments, the radio transceiver 1440 includes one or more transmitters and one or more receivers that enable UE 1400 to communicate according to various protocols and/or methods proposed for standardization by 3GPP and/or other standards bodies. For example, such functionality can operate cooperatively with processor 1410 to implement a PHY layer based on OFDM, OFDMA, and/or SC-FDMA technologies, such as described herein with respect to other figures.

In some exemplary embodiments, radio transceiver 1440 includes one or more transmitters and one or more receivers that can facilitate the UE 1400 to communicate with various LTE, LTE-Advanced (LTE-A), and/or NR networks according to standards promulgated by 3GPP. In some exemplary embodiments of the present disclosure, the radio transceiver 1440 includes circuitry, firmware, etc. necessary for the UE 1400 to communicate with various NR, NR-U, LTE, LTE-A, LTE-LAA, UMTS, and/or GSM/EDGE networks, also according to 3GPP standards. In some embodiments, radio transceiver 1440 can include circuitry supporting D2D communications between UE 1400 and other compatible devices.

In some embodiments, radio transceiver 1440 includes circuitry, firmware, etc. necessary for the UE 1400 to communicate with various CDMA2000 networks, according to 3GPP2 standards. In some embodiments, the radio transceiver 1440 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1440 can include a transceiver that is capable of wired communication, such as by using IEEE 802.3 Ethernet technology. The functionality particular to each of these embodiments can be coupled with and/or controlled by other circuitry in the UE 1400, such as the processor 1410 executing program code stored in program memory 1420 in conjunction with, and/or supported by, data memory 1430.

User interface 1450 can take various forms depending on the particular embodiment of UE 1400, or can be absent from UE 1400 entirely. In some embodiments, user interface 1450 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1400 can comprise a tablet computing device including a larger touchscreen display. In such embodiments, one or more of the mechanical features of the user interface 1450 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1400 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1400 having a touch screen display are capable of receiving user inputs, such as inputs related to exemplary methods described herein or otherwise known to persons of ordinary skill.

In some embodiments, UE 1400 can include an orientation sensor, which can be used in various ways by features and functions of UE 1400. For example, the UE 1400 can use outputs of the orientation sensor to determine when a user has changed the physical orientation of the UE 1400's touch screen display. An indication signal from the orientation sensor can be available to any application program executing on the UE 1400, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1460 of the UE 1400 can take various forms depending on the particular exemplary embodiment of UE 1400 and of the particular interface requirements of other devices that the UE 1400 is intended to communicate with and/or control. For example, the control interface 1460 can comprise an RS-232 interface, an RS-4145 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1460 can comprise an IEEE 802.3 Ethernet interface such as described above. In some exemplary embodiments of the present disclosure, the control interface 1460 can comprise analog interface circuitry including, for example, one or more digital-to-analog converters (DACs) and/or analog-to-digital converters (ADCs).

Persons of ordinary skill in the art can recognize the above list of features, interfaces, and radio-frequency communication standards is merely exemplary, and not limiting to the scope of the present disclosure. In other words, the UE 1400 can comprise more functionality than is shown in FIG. 14 including, for example, a video and/or still-image camera, microphone, media player and/or recorder, etc. Moreover, radio transceiver 1440 can include circuitry necessary to communicate using additional radio-frequency communication standards including Bluetooth, GPS, and/or others. Moreover, the processor 1410 can execute software code stored in the program memory 1420 to control such additional functionality. For example, directional velocity and/or position estimates output from a GPS receiver can be available to any application program executing on the UE 1400, including any program code corresponding to and/or embodying any exemplary embodiments (e.g., of methods) described herein.

Figure 15:
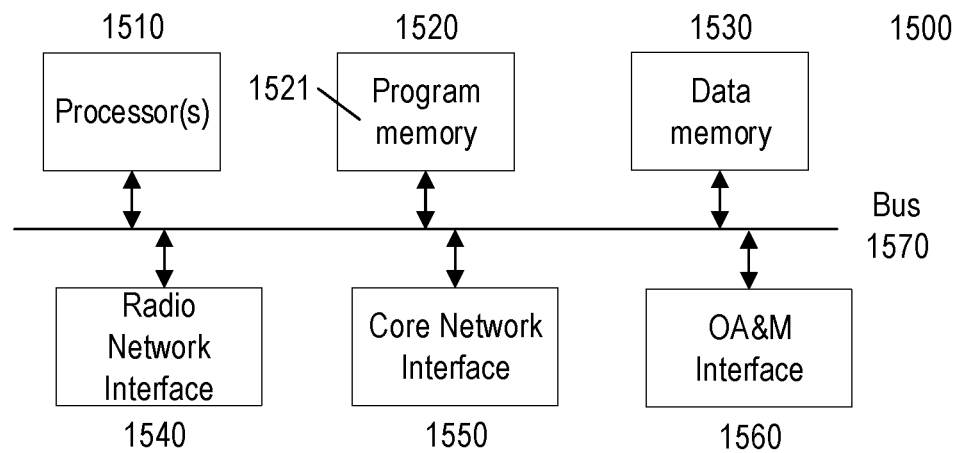
FIG. 15 is a block diagram of an exemplary network node according to various exemplary embodiments of the present disclosure.

FIG. 15 shows a block diagram of an exemplary network node 1500 according to various embodiments of the present disclosure, including those described above with reference to other figures. For example, exemplary network node 1500 can be configured by execution of instructions, stored on a computer-readable medium, to perform operations corresponding to one or more of the exemplary methods described herein. In some exemplary embodiments, network node 1500 can comprise a base station, eNB, gNB, or one or more components thereof. For example, network node 1500 can be configured as a central unit (CU) and one or more distributed units (DUs) according to NR gNB architectures specified by 3GPP. More generally, the functionally of network node 1500 can be distributed across various physical devices and/or functional units, modules, etc.

Network node 1500 can include processor 1510 (also referred to as "processing circuitry") that is operably connected to program memory 1520 and data memory 1530 via bus 1570, which can include parallel address and data buses, serial ports, or other methods and/or structures known to those of ordinary skill in the art.

Program memory 1520 can store software code, programs, and/or instructions (collectively shown as computer program product 1521 in FIG. 15) that, when executed by processor 1510, can configure and/or facilitate network node 1500 to perform various operations, including operations corresponding to various exemplary methods described herein. As part of and/or in addition to such operations, program memory 1520 can also include software code executed by processor 1510 that can configure and/or facilitate network node 1500 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1540 and/or core network interface 1550. By way of example, core network interface 1550 can comprise the S1 or NG interface and radio network interface 1540 can comprise the Uu interface, as standardized by 3GPP. Program memory 1520 can also comprise software code executed by processor 1510 to control the functions of network node 1500, including configuring and controlling various components such as radio network interface 1540 and core network interface 1550.

Data memory 1530 can comprise memory area for processor 1510 to store variables used in protocols, configuration, control, and other functions of network node 1500. As such, program memory 1520 and data memory 1530 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1510 can include multiple individual processors (not shown), each of which implements a portion of the functionality described above. In such case, multiple individual processors may be commonly connected to program memory 1520 and data memory 1530 or individually connected to multiple individual program memories and/or data memories. More generally, persons of ordinary skill will recognize that various protocols and other functions of network node 1500 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1540 can comprise transmitters, receivers, signal processors, ASICs, antennas, beamforming units, and other circuitry that enables network node 1500 to communicate with other equipment such as, in some embodiments, a plurality of compatible user equipment (UE). In some embodiments, interface 1540 can also enable network node 1500 to communicate with compatible satellites of a satellite communication network. In some exemplary embodiments, radio network interface 1540 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1540. According to further exemplary embodiments of the present disclosure, the radio network interface 1540 can comprise a PHY layer based on OFDM, OFDMA, and/or SC-FDMA technologies. In some embodiments, the functionality of such a PHY layer can be provided cooperatively by radio network interface 1540 and processor 1510 (including program code in memory 1520).

Core network interface 1550 can comprise transmitters, receivers, and other circuitry that enables network node 1500 to communicate with other equipment in a core network such as, in some embodiments, circuit-switched (CS) and/or packet-switched Core (PS) networks. In some embodiments, core network interface 1550 can comprise the S1 interface standardized by 3GPP. In some embodiments, core network interface 1550 can comprise the NG interface standardized by 3GPP. In some exemplary embodiments, core network interface 1550 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1550 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1500 can include hardware and/or software that configures and/or facilitates network node 1500 to communicate with other network nodes in a RAN, such as with other eNBs, gNBs, ng-eNBs, en-gNBs, IAB nodes, etc. Such hardware and/or software can be part of radio network interface 1540 and/or core network interface 1550, or it can be a separate functional unit (not shown). For example, such hardware and/or software can configure and/or facilitate network node 1500 to communicate with other RAN nodes via the X2 or Xn interfaces, as standardized by 3GPP.

OA&M interface 1560 can comprise transmitters, receivers, and other circuitry that enables network node 1500 to communicate with external networks, computers, databases, and the like for purposes of operations, administration, and maintenance of network node 1500 or other network equipment operably connected thereto. Lower layers of OA&M interface 1560 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1540, core network interface 1550, and OA&M interface 1560 may be multiplexed together on a single physical interface, such as the examples listed above.

Figure 16:
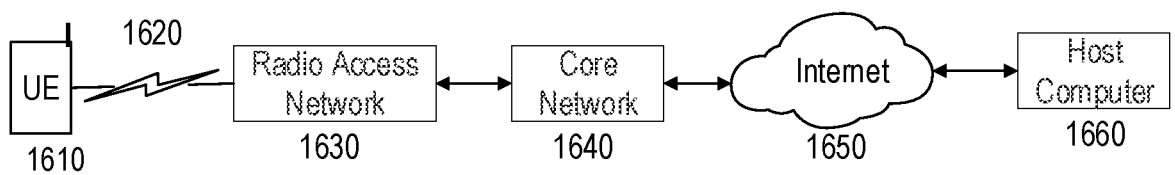
FIG. 16 is a block diagram of an exemplary network configured to provide over-the-top (OTT) data services between a host computer and a UE, according to various exemplary embodiments of the present disclosure.

FIG. 16 is a block diagram of an exemplary communication network configured to provide over-the-top (OTT) data services between a host computer and a user equipment (UE), according to one or more exemplary embodiments of the present disclosure. UE 1610 can communicate with radio access network (RAN) 1630 over radio interface 1620, which can be based on protocols described above including, e.g., LTE, LTE-A, and 5G/NR. For example, UE 1610 can be configured and/or arranged as shown in other figures discussed above.

RAN 1630 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1630 can cooperatively operate using licensed and unlicensed spectrum. In some embodiments, RAN 1630 can include, or be capable of communication with, one or more satellites comprising a satellite access network.

RAN 1630 can further communicate with core network 1640 according to various protocols and interfaces described above. For example, one or more apparatus (e.g., base stations, eNBs, gNBs, etc.) comprising RAN 1630 can communicate to core network 1640 via core network interface 1650 described above. In some exemplary embodiments, RAN 1630 and core network 1640 can be configured and/or arranged as shown in other figures discussed above. For example, eNBs comprising an E-UTRAN 1630 can communicate with an EPC core network 1640 via an S1 interface. As another example, gNBs and ng-eNBs comprising an NG-RAN 1630 can communicate with a 5GC core network 1630 via an NG interface.

Core network 1640 can further communicate with an external packet data network, illustrated in FIG. 16 as Internet 1650, according to various protocols and interfaces known to persons of ordinary skill in the art. Many other devices and/or networks can also connect to and communicate via Internet 1650, such as exemplary host computer 1660. In some exemplary embodiments, host computer 1660 can communicate with UE 1610 using Internet 1650, core network 1640, and RAN 1630 as intermediaries. Host computer 1660 can be a server (e.g., an application server) under ownership and/or control of a service provider. Host computer 1660 can be operated by the OTT service provider or by another entity on the service provider's behalf. For example, host computer 1660 can provide an over-the-top (OTT) packet data service to UE 1610 using facilities of core network 1640 and RAN 1630, which can be unaware of the routing of an outgoing/incoming communication to/from host computer 1660. Similarly, host computer 1660 can be unaware of routing of a transmission from the host computer to the UE, e.g., the routing of the transmission through RAN 1630. Various OTT services can be provided using the exemplary configuration shown in FIG. 16 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 16 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for ultra-reliable, low-latency communication (URLLC) by configuring for UEs—such as UE 1610—to transmit and/or receive multiple versions of a data block on separate physical data channel (e.g., PDSCH or PUSCH). In this manner, PDSCH diversity by multi-TRP transmission to a single UE can be achieved. This can increase reliability, reduce latency, and/or reduce UE complexity. When used in NR UEs (e.g., UE 1610) and gNBs (e.g., gNBs comprising RAN 1630), exemplary embodiments described herein can provide various improvements, benefits, and/or advantages that facilitate the use of data services (e.g., URLLC) having strict performance requirements. As a consequence, this improves the performance of these services as experienced by OTT service providers and end-users, including more consistent data throughout and lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art. The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

1. A method for receiving a plurality of physical data channels, such as PDSCHs or PUSCHs, transmitted by different sources in a wireless communication network, the method comprising at least one of:
   receiving, optionally via one or more physical control channels, such as (PDCCH), an indication of one or more of the following:
      an indicated state, such as a Transmission Configuration Indicator (TCI) state, including one or more source reference signal (RS) pairs; and
      a plurality of antenna ports for transmission of demodulation reference signal (DM-RS) that are associated with the respective physical data channel, e.g. PDSCH;
   for each of the source RS pairs associated with the indicated state, determining a quasi-colocation (QCL) relationship between the particular source RS pair and/or a subset of antenna ports that are mapped to a particular code-division multiplexing (CDM) group; and
   based on the determined QCL relationships, receiving the plurality of physical data channels in association with the plurality of DM-RS from the plurality of transmission sources.

2. The method of embodiment 1, further comprising one or more of:
   receiving, from the network, an indication of a plurality of =states, e.g. TCI states, each state including a plurality of source RS pairs; and
   for each of the plurality of states, determining channel parameters based on receiving the source RS associated with the particular state.

3. The method of embodiment 2, wherein the indicated state is one of the plurality of states.

4. The method of any of embodiments 2-3, further comprising receiving a control message that activates at least a subset of the plurality of states, wherein the channel parameters are determined only for the activated subset of states.

5. The method of any of embodiments 2-4, wherein receiving the plurality of physical data channels is further based on the channel parameters determined from receiving the source RS.

6. The method of any of embodiments 1-5, wherein each source RS pair of the indicated TCI state is individually configured.

7. The method of any of embodiments 1-6, wherein the DM-RS associated with the respective PDSCH are Type-1, and the indicated state includes no more than two source RS pairs.

8. The method of any of embodiments 1-7, wherein the DM-RS associated with the respective PDSCH are Type-2, and the indicated state includes no more than three source RS pairs.

9. The method of embodiment 8, wherein the determined QCL relationships include relationships between first, second, and third source RS pairs and DM-RS mapped to respective first, second, and third CDM groups.

10. The method of any of embodiments 1-7, wherein, one or more of the following hold:
   the indicated state is one of a symmetric pair of TCI states, each having the same first and second source RS pairs; and
   each state of the symmetric pair can be used to establish different QCL relationships between the first and second source RS pairs and antenna ports that are mapped to first and second CDM groups.

11. The method of any of embodiments 1-7, wherein, optionally,
   the number of source RS pairs comprising the indicated state is greater than the number of CDM groups associated with the indicated plurality of antenna ports; and, optionally,
   determining the QCL relationships comprises associating the first source RS pair with all indicated antenna ports across all CDM groups.

12. The method of any of embodiments 1-7, wherein determining the QCL relationships comprises associating a first source RS pair, of the state, to a subset of the indicated antenna ports that are mapped to the CDM group having the lowest index among the indices of all CDM groups mapped to the indicated antenna ports.

13. The method of any of embodiments 1-12, further comprising receiving, via the one or more PDCCH, an indication of a subsequent time for receiving the one or more physical data channels, wherein:
   the method is performed by a user equipment (UE); and
   determining the QCL relationships comprises determining whether the duration between reception of the one or more PDCCH and the subsequent time is greater than a threshold that is specific to the UE.

14. The method of any of embodiments 1-13, wherein each entry of each source RS pair relates to a QCL relationship based on one or more of the following: Doppler shift, Doppler spread, average delay, delay spread, and spatial reception.

15. The method of any of embodiments 1-14, wherein determining the QCL relationship for each particular source RS pair is based on whether one entry within that particular source RS pair is empty.

16. The method of any of embodiments 1-15, wherein the plurality of physical data channels carry different redundancy versions (RVs) of a single data block.

17. A method for transmitting a plurality of physical data channels, e.g. PDSCHs or PUSCHs, to a single user equipment (UE) by a different sources in a wireless communication network, the method comprising one or more of:
- transmitting, to the UE, optionally via one or more physical downlink control channels (PDCCH), an indication of one or more of the following:
  - a plurality of antenna ports for transmission of demodulation reference signal (DM-RS) that are associated with the respective PDSCH, each antenna port being mapped to one of a plurality of code-division multiplexing (CDM) groups; and
  - a state, such as a Transmission Configuration Indicator (TCI) state including one or more source reference signal (RS) pairs, each source RS pair having a quasi-colocation (QCL) relationship with a subset of the antenna ports that are mapped to a particular CDM group; and
- transmitting, from the plurality of antenna ports, the plurality of physical data channels in association with the plurality of DM-RS.

18. The method of embodiment 17, further comprising transmitting, to the UE, an indication of a plurality of states, such as TCI states, each state including a plurality of source RS pairs.

19. The method of embodiment 18, further comprising transmitting, from the different transmission sources, the source RS comprising the source RS pairs of the plurality of states.

20. The method of embodiment 19, further comprising transmitting a control message that activates at least a subset of the plurality of states, wherein the transmitted source RS correspond to only the activated subset of states.

21. The method of any of embodiments 17-20, wherein the indicated TCI state is one of the plurality of states.

22. The method of any of embodiments 17-21, wherein each source RS pair of the indicated state is individually configured.

23. The method of any of embodiments 17-22, wherein the DM-RS associated with the respective physical data channel are Type-1, and the indicated state includes no more than two source RS pairs.

24. The method of any of embodiments 17-22, wherein the DM-RS associated with the respective physical data channel are Type-2, and the indicated state includes no more than three source RS pairs.

25. The method of embodiment 24, wherein the indicated state includes first, second, and third source RS pairs having quasi-colocation (QCL) relations with DM-RS mapped to respective first, second, and third CDM groups.

26. The method of any of embodiments 17-22, wherein:
- the indicated state is one of a symmetric pair of TCI states, each having the same first and second source RS pairs; and
- each state of the symmetric pair is associated with different QCL relationships between the first and second source RS pairs and antenna ports that are mapped to first and second CDM groups.

27. The method of any of embodiments 17-22, wherein:
- the number of source RS pairs comprising the indicated state is greater than the number of CDM groups associated with the indicated plurality of antenna ports; and
- the first source RS pair has a QCL relationship with all indicated antenna ports across all CDM groups.

28. The method of any of embodiments 17-27, wherein a first source RS pair, of the indicated state, has a QCL relationship with a subset of the indicated antenna ports that are mapped to the CDM group having the lowest index among the indices of all CDM groups mapped to the indicated antenna ports.

29. The method of any of embodiments 17-28, wherein each entry of each source RS pair relates to a QCL relationship based on one or more of the following: Doppler shift, Doppler spread, average delay, delay spread, and spatial reception.

30. The method of any of embodiments 17-29, wherein the plurality of PDSCH carry different redundancy versions (RVs) of a single data block.

31. A user equipment (UE) configured to receive a plurality of physical downlink shared channels (PDSCHs) transmitted by different sources in a wireless communication network, the UE comprising:
- communication circuitry configured to communicate with the wireless communication network; and
- processing circuitry operatively associated with the communication circuitry and configured to perform operations corresponding to the methods of any of exemplary embodiments 1-16.

32. A radio access network (RAN) arranged to transmit a plurality of physical downlink shared channels (PDSCH) to a single user equipment (UE) via a plurality of transmission sources in the RAN, the RAN comprising:
- communication circuitry configured to communicate with the UE; and
- processing circuitry operatively associated with the communication circuitry and configured to perform operations corresponding to the methods of any of embodiments 17-30.

33. A non-transitory, computer-readable medium storing computer-executable instructions that, when executed by at least one processor of a user equipment (UE), configure the UE to perform operations corresponding to the methods of any of exemplary embodiments 1-16.

34. A non-transitory, computer-readable medium storing computer-executable instructions that, when executed by at least one processor comprising a radio access network (RAN), configure the RAN to perform operations corresponding to the methods of any of exemplary embodiments 17-30.

Group A Embodiments

A1. A UE configured to, and/or comprising a radio interface and/or comprising processing circuitry configured to cause the user equipment to receive a DCI message (or other downlink message) containing an extended TCI state (or other indicator) comprising multiple source RSs for QCL indication and/or a DMRS antenna port indicator, wherein, optionally, each source RS pair is associated with indicated antenna ports in one CDM group.

A2. The UE in A1, wherein, optionally, one or more of the following features may also apply:
- Where each source RS pair in a TCI state with multiple such pairs is individually configured [e.g. to maximize the flexibility]
- Where a TCI state has at most two source RS pairs when scheduling using DMRS Type 1
- Where a TCI state has at most three source RS pairs when scheduling using DMRS Type 2

Where the DMRS antenna port indicator can dynamically select between two ports in CDM group 0 and 1 port in CDM group 1 or one port in CDM group 0 and two ports in CDM group 1

Where the DMRS antenna port indicator can select one port in each of CDM group 0, 1 and 2 when DMRS type 2 is used Where in case the DCI indicates a larger number of source RS pairs than the number of indicated CDM groups by the antenna port indicator and the first source RS pair is used as the source QCL for all indicated antenna ports across multiple CDM groups where the association between a source RS pair included in the extended TCI state and the indicated antenna ports in one CDM group may depend on one or more of the following predefined rules:

if the time offset between the reception of the DCI message and the corresponding PDSCH is less than the Threshold-Sched-Offset reported by the UE as part of its UE capability if the extended TCI state contains 'QCL-TypeD' in any of its {qcl-Type1, qcl-Type2} pairs A3. A method for a UE, comprising steps as in any of A1 and A2.

A4. A network node a radio interface and/or comprising processing circuitry configured to cause the network node to allow a user equipment (UE) to operate as in any of A1-A2.

A5. A method for a network node, comprising steps as in A3.

The invention claimed is:

1. A method for a user equipment (UE) to transmit or receive a plurality of physical data channels in a wireless network, the method comprising:
   receiving, from the wireless network, an indication of a Transmission Configuration Indicator (TCI) state that includes the following:
      a plurality of source reference signal (RS) pairs, each source RS pair comprising first and second source RS; and
      for each source RS pair, a corresponding pair of quasi-colocation (QCL) relations between the first and second source RS and a single code-division multiplexing (CDM) group of demodulation reference signal (DM-RS) antenna ports,
      wherein each source RS pair has a corresponding pair of QCL relations with a different CDM group than all other source RS pairs of the plurality; and
   receiving or transmitting the plurality of physical data channels based on the QCL relations for the plurality of source RS pairs of the indicated TCI state.

2. The method of claim 1, further comprising receiving, from the wireless network, an indication of a plurality of the antenna ports for DM-RS, wherein each antenna port is mapped to a CDM group associated with one of the physical data channels.

3. The method of claim 1, wherein each physical data channel is associated with a corresponding CDM group and is received or transmitted in association with the plurality of DM-RS having antenna ports mapped to the corresponding CDM group.

4. The method of claim 1, wherein one of the following applies:
   the plurality of physical data channels are respective layers of a physical downlink shared channel (PDSCH);
   the plurality of physical data channels are respective layers of a physical uplink shared channel (PUSCH);
   each physical data channel is a subset of all layers of a PDSCH; or
   each physical data channel is a subset of all layers of a PUSCH.

5. The method of claim 1, wherein the indicated TCI state includes:
   a first source RS pair having a corresponding first pair of QCL relations with all antenna ports associated with a first CDM group; and
   a second source RS pair having a corresponding second pair of QCL relations with all antenna ports associated with a second CDM group.

6. The method of claim 5, wherein the number of antenna ports associated with the first CDM group is different than the number of antenna ports associated with the second CDM group.

7. The method of claim 5, wherein:
   the indicated TCI state also includes a third source RS pair having a corresponding third pair of QCL relations with all antenna ports associated with a third CDM group; and
   the first, second, and third CDM groups are associated with respective first, second, and third sources in the wireless network.

8. The method of claim 5, wherein the indicated TCI state identifies a first TCI state including the first source RS pair and a second TCI state including the second source RS pair.

9. The method of claim 5, wherein:
   the first and second CDM groups are associated with respective first and second indices; and
   the first index is less than the second index.

10. The method of claim 9, further comprising receiving, from the wireless network, scheduling information for the physical data channels, wherein the scheduling information includes the first and second indices associated with the respective first and second CDM groups.

11. The method of claim 1, wherein:
   the indicated TCI state is one of a symmetric pair of TCI states;
   each TCI state of the symmetric pair includes first and second source RS pairs; and
   each TCI state of the symmetric pair has different QCL relations between the first and second source RS pairs and antenna ports that are mapped to first and second CDM groups.

12. The method of claim 1, wherein one of the following applies:
   the DM-RS are Type-1 and the TCI state includes no more than two source RS pairs; or
   the DM-RS are Type-2 and the TCI state includes no more than three source RS pairs.

13. The method of claim 1, further comprising:
   receiving, from the wireless network, an indication of a plurality of TCI states, each TCI state including a plurality of source RS pairs, each source RS pair comprising first and second source RS; and
   for each of the plurality of TCI states, determining channel parameters based on receiving the source RS of the plurality of source RS pairs associated with the TCI state.

14. The method of claim 13, wherein the TCI state indicated by the configuration information is one of the plurality of TCI states.

15. The method of claim 13, wherein receiving the plurality of physical data channels based on the QCL relations comprises, for each of the physical data channels:

selecting a subset of the determined channel parameters based on the QCL relations associated with the CDM group corresponding to the physical data channel;

receiving the DM-RS mapped to the corresponding CDM group based on the subset of channel parameters;

determining further channel parameters based on the received DM-RS; and receiving the physical data channel based on the further channel parameters.

16. A method for by a wireless network to transmit or receive a plurality of physical data channels with a single user equipment (UE), the method comprising:

transmitting, to the UE, an indication of a Transmission Configuration Indicator (TCI) state that includes the following:

a plurality of source reference signal (RS) pairs, each source RS pair comprising first and second source RS; and for each source RS pair, a corresponding pair of quasi-colocation (QCL) relations between the first and second source RS and a single code-division multiplexing (CDM) group of demodulation reference signal (DM-RS) antenna ports, wherein each source RS pair has a corresponding pair of QCL relations with a different CDM group than all other source RS pairs of the plurality; and transmitting the plurality of physical data channels to, or receiving the plurality of physical data channels from, the UE based on the QCL relations for the plurality of source RS pairs of the indicated TCI state.

17. The method of claim 16, further comprising transmitting, to the UE, an indication of a plurality of the antenna ports for DM-RS, wherein each antenna port is mapped to a CDM group associated with one of the physical data channels.

18. The method of claim 16, wherein each physical data channel is associated with a corresponding CDM group and is transmitted or received in association with the plurality of DM-RS having antenna ports mapped to the corresponding CDM group.

19. The method of claim 16, wherein one of the following applies:

the plurality of physical data channels are respective layers of a physical downlink shared channel (PDSCH);

the plurality of physical data channels are respective layers of a physical uplink shared channel (PUSCH);

each physical data channel is a subset of all layers of a PDSCH; or each physical data channel is a subset of all layers of a PUSCH.

20. The method of claim 16, wherein the indicated TCI state includes:

a first source RS pair having a corresponding first pair of QCL relations with all antenna ports associated with a first CDM group; and a second source RS pair having a corresponding second pair of QCL relations with all antenna ports associated with a second CDM group.

21. The method of claim 20, wherein the number of antenna ports associated with the first CDM group is different than the number of antenna ports associated with the second CDM group.

22. The method of claim 20, wherein:

the indicated TCI state also includes a third source RS pair having a corresponding third pair of QCL relations with all antenna ports associated with a third CDM group; and the first, second, and third CDM groups are associated with respective first second and third sources.

23. The method of claim 20, wherein the indicated TCI state identifies a first TCI state including the first source RS pair and a second TCI state including the second source RS pair.

24. The method of claim 20, wherein:

the first and second CDM groups are associated with respective first and second indices; and the first index is less than the second index.

25. The method of claim 24, further comprising transmitting, to the UE, scheduling information for the physical data channels, wherein the scheduling information includes the first and second indices associated with the respective first and second CDM groups.

26. The method of claim 16, wherein:

the indicated TCI state is one of a symmetric pair of TCI states;

each TCI state of the symmetric pair includes first and second source RS pairs; and each TCI state of the symmetric pair has different QCL relations between the first and second source RS pairs and antenna ports that are mapped to first and second CDM groups.

27. The method of claim 16, wherein one of the following applies:

the DM-RS are Type-1, and the TCI state includes no more than two source RS pairs; or the DM-RS are Type-2, and the TCI state includes no more than three source RS pairs.

28. The method of claim 16, further comprising transmitting, to the UE, an indication of a plurality of TCI states, each TCI state including a plurality of source RS pairs, each source RS pair comprising first and second source RS, wherein the TCI state indicated by the configuration information is one of the plurality of TCI states.

29. A user equipment (UE) configured to transmit or receive a plurality of physical data channels in a wireless network, the UE comprising:

radio transceiver circuitry configured to communicate with a plurality of nodes in the wireless network; and processing circuitry operatively coupled to the radio transceiver circuitry, whereby the processing circuitry and the radio transceiver circuitry are configured to perform the method of claim 1.

30. A non-transitory, computer-readable medium storing computer-executable instructions that, when executed by processing circuitry of a user equipment (UE) configured to transmit or receive a plurality of physical data channels in a wireless network, configure the UE to perform the method of claim 1.

31. A wireless network comprising one or more nodes, the wireless network being configured to transmit or receive a plurality of physical data channels with a single user equipment (UE), the one or more nodes comprising:

radio network interface circuitry configured to communicate with the UE; and processing circuitry operatively coupled to the radio network interface circuitry, whereby the processing circuitry and the radio network interface circuitry are configured to perform the method of claim 16.

32. A non-transitory, computer-readable medium storing computer-executable instructions that, when executed by processing circuitry of one or more nodes a wireless network configured to transmit or receive a plurality of physical data channels with a single user equipment (UE), configure the one or more nodes to perform the method of claim 16.

* * * * *